US010425835B2

(12) United States Patent
Ho et al.

(10) Patent No.: US 10,425,835 B2
(45) Date of Patent: Sep. 24, 2019

(54) POST NETWORK ENTRY CONNECTION METHOD IN MILLIMETER WAVE COMMUNICATION SYSTEM AND RELATED APPARATUSES USING THE SAME

(71) Applicant: Industrial Technology Research Institute, Hsinchu (TW)

(72) Inventors: Chung-Lien Ho, Taoyuan (TW); Ren-Jr Chen, Hsinchu (TW); Wen-Chiang Chen, Hsinchu (TW)

(73) Assignee: Industrial Technology Research Institute, Hsinchu (TW)

( * ) Notice: Subject to any disclaimer, the term of this patent is extended or adjusted under 35 U.S.C. 154(b) by 161 days.

(21) Appl. No.: 15/367,201

(22) Filed: Dec. 2, 2016

(65) Prior Publication Data

US 2017/0164377 A1 Jun. 8, 2017

Related U.S. Application Data

(60) Provisional application No. 62/262,926, filed on Dec. 4, 2015, provisional application No. 62/262,927, filed on Dec. 4, 2015.

(51) Int. Cl.
*H04W 16/28* (2009.01)
*H04W 48/16* (2009.01)
(Continued)

(52) U.S. Cl.
CPC .......... *H04W 16/28* (2013.01); *H04B 7/0695* (2013.01); *H04B 7/088* (2013.01);
(Continued)

(58) Field of Classification Search
None
See application file for complete search history.

(56) References Cited

U.S. PATENT DOCUMENTS 7,230,931 B2 6/2007 Struhsaker
8,594,053 B2 11/2013 Kim et al.
(Continued)

FOREIGN PATENT DOCUMENTS

CN 103718591 4/2014
CN 104956606 9/2015
(Continued)

OTHER PUBLICATIONS

Pi et al., "An introduction to millimeter-wave mobile broadband systems," IEEE Communications Magazine, Jun. 2011, pp. 101-107.
(Continued)

*Primary Examiner* — Noel R Beharry
*Assistant Examiner* — Ruihua Zhang
(74) *Attorney, Agent, or Firm* — JCIPRNET

(57) ABSTRACT

In one of the exemplary embodiments, the disclosure is directed to a post network entry connection method applicable to a user equipment. The method would include not limited to: receiving a time unit which may include a payload region and a downlink header region which may include a first BQMR for a first scan beam and a second BQMR for a second scan beam; obtaining a first reference signal from the first BQMR and a second reference signal from the second BQMR; calculating a first signal quality measurement by using the first reference signal and calculating a second signal quality measurement by using the second reference signal; selecting the first scan beam based on the first signal quality measurement being better than at least the second signal quality measurement; and transmitting the first signal quality measurement which corresponds to the first scan beam via another time unit.

32 Claims, 21 Drawing Sheets

(51) Int. Cl.

| | |
|---|---|
| *H04W 74/08* | (2009.01) |
| *H04L 5/00* | (2006.01) |
| *H04W 36/00* | (2009.01) |
| *H04W 72/04* | (2009.01) |
| *H04W 72/08* | (2009.01) |
| *H04B 7/06* | (2006.01) |
| *H04B 7/08* | (2006.01) |
| *H04W 88/02* | (2009.01) |
| *H04W 88/08* | (2009.01) |
| *H04L 27/26* | (2006.01) |

(52) U.S. Cl.
CPC ............ *H04L 5/005* (2013.01); *H04L 5/0023* (2013.01); *H04L 5/0044* (2013.01); *H04L 5/0048* (2013.01); *H04L 5/0051* (2013.01); *H04W 36/0088* (2013.01); *H04W 48/16* (2013.01); *H04W 72/046* (2013.01); *H04W 72/0413* (2013.01); *H04W 72/085* (2013.01); *H04W 74/0833* (2013.01); *H04L 27/2602* (2013.01); *H04W 88/02* (2013.01); *H04W 88/08* (2013.01)

(56) References Cited

U.S. PATENT DOCUMENTS

| | | | |
|---|---|---|---|
| 9,237,582 B2 | 1/2016 | Seol et al. | |
| 9,762,344 B2* | 9/2017 | Ko | H04L 5/0048 |
| 2009/0225883 A1* | 9/2009 | Orlik | H04W 72/046 |
| | | | 375/260 |
| 2013/0059619 A1 | 3/2013 | Kim et al. | |
| 2014/0148107 A1 | 5/2014 | Maltsev et al. | |
| 2015/0340049 A1* | 11/2015 | Zhang | H04B 3/23 |
| | | | 704/227 |
| 2015/0372740 A1* | 12/2015 | Ko | H04B 7/0456 |
| | | | 370/329 |
| 2015/0373627 A1 | 12/2015 | Ryu et al. | |
| 2015/0382205 A1* | 12/2015 | Lee | H04B 7/0417 |
| | | | 370/329 |
| 2016/0021549 A1 | 1/2016 | Subramanian et al. | |
| 2016/0029403 A1* | 1/2016 | Roy | H04W 72/0406 |
| | | | 370/336 |
| 2016/0065286 A1 | 3/2016 | Kim et al. | |
| 2016/0183234 A1 | 6/2016 | Sung et al. | |
| 2017/0070991 A1* | 3/2017 | Subramanian | H04W 16/28 |
| 2017/0231010 A1* | 8/2017 | Jung | H04W 74/0833 |
| 2018/0076940 A1* | 3/2018 | Zhou | H04L 5/0048 |
| 2018/0145857 A1* | 5/2018 | Kim | H04L 27/2613 |
| 2018/0184439 A1* | 6/2018 | Lee | H04W 72/12 |

FOREIGN PATENT DOCUMENTS

| | | |
|---|---|---|
| TW | 200534532 | 10/2005 |
| TW | 201424419 | 6/2014 |

OTHER PUBLICATIONS

Roh et al., "Millimeter-wave beamforming as an enabling technology for 5G cellular communications: theoretical feasibility and prototype results," IEEE Communications Magazine, Feb. 2014, pp. 106-113.

Rajagopal et al., "Antenna Array Design for Multi-Gbps mmWave Mobile Broadband Communication," IEEE Global Telecommunications Conference (GLOBECOM 2011), Dec. 5-9, 2011, pp. 1-6.

Khan et al., "Millimeter-wave mobile broadband with large scale spatial processing for 5G mobile communication," 50th Annual Allerton Conference on Communication, Control, and Computing (Allerton), Oct. 1-5, 2012, pp. 1517-1523.

Kim et al., "Tens of Gbps support with mmWave beamforming systems for next generation communications," IEEE Global Telecomm. Conf. (GLOBECOM'13), Dec. 2013, pp. 3685-3690.

Yin et al., "High-Throughput Beamforming Receiver for Millimeter Wave Mobile Communication," IEEE Global Communications Conference (GLOBECOM), Dec. 9-13, pp. 3697-3702.

Kyocera, "Dynamic Beam Selection CSI-RS Enhancement Scheme for EB/FD-MIMO", 3GPP TSG RAN WG1 Meeting #81,R1-153112, May 25-29, 2015,pp. 1-2.

"Office Action of Taiwan Counterpart Application," dated Jun. 28, 2017, p. 1-p. 13, in which the listed references were cited.

* cited by examiner

| Uplink-downlink configuration index | Downlink-to-Uplink Switch-point periodicity | Subframe number | | | | | | | | | |
|---|---|---|---|---|---|---|---|---|---|---|---|
| | | BF header | | | PL region | | | | | | |
| | | 0 | 1 | 2 | 3 | 4 | 5 | 6 | 7 | 8 | 9 |
| 0 | 2 ms | D | S | U | D | D | D | D | D | S | U |
| 1 | 2 ms | D | S | U | D | D | D | D | S | U | U |
| 2 | 2 ms | D | S | U | D | D | D | S | U | U | U |

FIG. 13

POST NETWORK ENTRY CONNECTION METHOD IN MILLIMETER WAVE COMMUNICATION SYSTEM AND RELATED APPARATUSES USING THE SAME

CROSS REFERENCE TO RELATED APPLICATION

This application claims the priority benefit of U.S. provisional application Ser. No. 62/262,926 filed on Dec. 4, 2015 and U.S. provisional application Ser. No. 62/262,927 filed on Dec. 4, 2015. The entirety of each of the above-mentioned patent applications is hereby incorporated by reference herein and made a part of specification.

TECHNICAL FIELD

The disclosure is directed to a post network entry connection method in a millimeter wave communication system and related apparatuses using the same method.

BACKGROUND

The antenna array aperture for mmWave is first introduced. It has been known that propagation of an electromagnetic wave is typically poorer at higher frequencies than lower frequencies. For example, the attenuation of electromagnetic waves around the millimeter wave (mmWave) frequency range would typically be higher than the attenuation around the micro wave frequency range as the path loss is usually more severe at higher frequencies. FIG. 1 illustrates such scenario with a transmitter (Tx) transmitting electromagnetic wave toward a receiver (Rx), and the mmWave aperture 101 is smaller than microwave aperture 102 since the mmWave has smaller wavelength. For an omni-directional antenna at both the transmitter and receiver, the received power ($P_r$) could be expressed as $$P_r = A_{eff} \frac{P_t}{4\pi d^2} = \left(\frac{\lambda}{4\pi d}\right)^2 P_t, \text{ in which } A_{eff} = \frac{\lambda^2}{4\pi} \quad \text{Equation (1)}$$

$A_{eff}$ is the antenna effective aperture with $\lambda$ being the wavelength, $P_t$ is the transmit power and d the distance between the transmit antenna and receive antenna. The frequency of an electromagnetic wave has an inverse relationship from the wavelength of the electromagnetic wave, and the wavelength of the electromagnet wave is proportional to the size of the antenna. For example, if the propagating frequency is 30 GHz, then the wavelength is 10 mm; if the propagating frequency is 60 GHz, then the wavelength is 5 mm; and so forth.

Referring to FIG. 1, it can derived from Equation (1) that a system driving at a higher frequency would lead to a smaller antenna aperture and thus a lower received power. For example, an additional 20 dB extra loss could be incurred by the mmWave system as the propagating is increased from 3 GHz to 30 GHz. In such case, large arrays could be required in order to increase the aperture to compensate the loss. On the other hand, additional losses such as the foliage loss which limits the coverage in forests and the heavy rains resulting in several dB losses in a 100 meter link may require larger margin in link budgets according to the high frequency operation.

Also due to higher propagating frequency, mmWave signals could be more sensitive to the blockages by some materials, such as metals or brick walls, in comparison to microwave signals. This would result in isolations of an indoor network from an outdoor network in the mmWave. Such phenomenon could be explained by comparing a line of sight (LOS) environment and a non-line-of-sight (NLOS) environment. FIG. 2 illustrates a LOS environment relative to a NLOS environment. Specifically, signals propagating in a LOS environment would be more like propagating in free space which exhibits a path loss exponent (PLE) in the range of 2~3. However, signals propagating in the NOS environment would be much weaker, more sensitive to the environment, and exhibits the PLE in the range of 3~4. For an accurate analysis without a loss of generality, incorporating the blockage effects in channel modeling could be needed.

In order to achieve a higher data rate, a larger bandwidth may be considered especially in mmWave wireless broadband systems. In such a system, the communication link with a larger bandwidth may lead to a higher noise power and thus a lower signal-to-noise ratio (SNR). FIG. 3 illustrates noise bandwidth in mmWave relative to noise bandwidth in microwave. As shown in FIG. 3, the mmWave noise bandwidth 301 would be greater than the microwave noise bandwidth 302. An extra noise power of 10 dB could be present from 50 MHz to 500 MHz. Therefore, a larger gain could be required in the mmWave communication system in order to compensate the power loss by using larger antenna arrays.

As for the beamforming operation for the mmWave communication system, there could be multiple beamforming schemes which includes digital baseband beamforming as shown in FIG. 4(a), analog baseband beamforming as shown in FIG. 4(b), and analog radio frequency (RF) beamforming as shown in FIG. 4(c). For power consumption and cost issues, the transmitter or the receiver may limit the number of RF chains. Thus, the analog RF beamforming as shown in FIG. 4(c) might be a good candidate in mmWave communications.

FIG. 5 illustrates examples of radiation patterns of different transmission wavelengths. In general, a communication system operating in the microwave band which has wavelengths in the centimeter range tend to have a small number of antennas. The radiation pattern of a single microwave frequency antenna 501 tending to be long distance, has a broad field-of-view (FoV) coverage, and is typical for a 3G/4G communication systems that use the micro-wave band with small number of BS antennas to achieve a higher receive SNR quality. However, low data rate due to small BS exists in such the systems. To increase the data rate by using a large BW, mmWave band is considered in the future communication system (e.g. 5G systems). The radiation pattern of a single mmWave single frequency antenna 502 covers a shorter distance; however, the mmWave radiation pattern 503 could be extended by using an mmWave antenna array for beamforming under the same transmitted power. Each of the BS beams 504 may have a different beam ID. In general, an mmWave communication system that uses a small sized antenna array tends to have a shorter distance and a broad coverage; whereas an mmWave communication system that uses a larger sized antenna array tend to have a longer distance, and a narrower coverage.

The transmission framework of mmWave wireless communication systems could be classified into two categories based on the radio access interface. A first category is multiple radio access technology (multi-RAT) and a second category is single radio access technology (Single-RAT). FIG. 6 illustrates an example of a 5G multi-RAT communication system of the first category and the second category.

The multi-RAT system has at least two RATs such as a LTE system and an mmWave system which have been phrased as the LTE+mmWave integrated system which would co-exist simultaneously for communications. For example, control signaling could be transmitted by using the conventional LTE communication frequency whereas the user data could be transmitted by using mmWave communication frequency. In such case, the carrier aggregation (CA) scheme could be utilized. The user data could be transmitted over the mmWave band by using, for example, a secondary component carrier (SCC), but control signals could be transmitted over the microwave frequency by using a primary component carrier (PCC). Network entry could be performed via the cmWave by using a PCC since a successful detection rate for control signaling could be operated in large coverage, high mobility and low SNR scenarios. On the other hand, the single-RAT communication system of the second category would use only one radio access technology for communication applications by using the mmWave band to transmit both user data and control signals. Network entry would be performed via a carrier in the mmWave band. Thus, a successful detection rate for control signaling may need to be operated in small coverage, low mobility and high SNR scenarios. To remedy this problem, beamforming technique may be used.

FIG. 7 illustrates a scheduling request procedure triggered by random access channel (RACH) of a legacy communication system. In step S701, in order to initiate a session by connecting to a network through a base station (BS), a UE would transmit a random access preamble (RAP) which includes not limited to a random access radio network temporary identifier (RA-RNTI) in a random access channel (RACH). In response to receiving the RAP, in step S702, the BS would transmit a random access response (RAR) to the UE and subsequently the BS would also transmit in a downlink shared channel (DL-SCH) a RA-RANTI, a cell radio network temporary identifier (C-RNTI), and timing alignment (TA) information. In step S703, a UE with the C-RNTI would transmit a RRC connection request message by using an uplink shared channel (UL-SCH). The RRC connection request message would include a temporary mobile subscriber identifier (M-TMSI), and establishment cause. In step S704, the BS by using a DL-SCH would transmit a RRC setup message which may include information related to signaling radio bearer (SRB), data radio bearer (DRB) and UE specific configuration. Subsequently, the network would establish SRB(s) and DRB(s) with the UE based on the establishment cause. In step S705, the UE by using a UL-SCH to acknowledge the setup of the SRB(s) and DRB(s), would transmit to the BS a RRC connection complete message which may include a public land mobile network identifier (PLMN ID) and dedicated non-access stratum (NAS) information.

IT should be noted that, as shown in FIG. 7, there is no beam related processing during the scheduling request procedure. For example, in the legacy LTE system, the signaling messages involving random access procedures (e.g. S701 S702) as well as RRC connection messages (e.g. S703 S704 S705) all reply upon transmissions that are omni-directional. However, for communication systems that use beam forming for both control signaling and data signaling by operating in the mmWave frequency, the current transmission scheme could be inadequate.

SUMMARY OF THE DISCLOSURE

Accordingly, the disclosure is directed to a post network entry connection method in a millimeter wave communication system and related apparatuses using the same method.

In one of the exemplary embodiments, the disclosure is directed to a post network entry connection method applicable to a user equipment in a millimeter wave communication system. The method would include not limited to: receiving a time unit which may include a payload region and a downlink header region which may include a first beam quality measurement resource (BQMR) for a first scan beam and a second BQMR for a second scan beam; obtaining a first reference signal from the first BQMR and a second reference signal from the second BQMR; calculating a first signal quality measurement by using the first reference signal and calculating a second signal quality measurement by using the second reference signal; selecting the first scan beam based on the first signal quality measurement being better than at least the second signal quality measurement; and transmitting the first signal quality measurement which corresponds to the first scan beam via another time unit.

In one of the exemplary embodiments, the disclosure is directed to a user equipment which includes not limited to a transmitter which transmits signals in a millimeter wave (mmWave) frequency range, a receiver which receives signals in a millimeter wave (mmWave) frequency range, and a processor coupled to the transmitter and the receiver and is configured at least to: receive, via the receiver, a time unit which may include a payload region and a downlink header region which may include a first beam quality measurement resource (BQMR) for a first scan beam and a second BQMR for a second scan beam; obtain a first reference signal from the first BQMR and a second reference signal from the second BQMR; calculate a first signal quality measurement by using the first reference signal and calculate a second signal quality measurement by using the second reference signal; select the first scan beam based on the first signal quality measurement being better than at least the second signal quality measurement; and transmit the first signal quality measurement which corresponds to the first scan beam via another time unit In one of the exemplary embodiments, the disclosure is directed to a post network entry connection method applicable to a base station (BS) in a millimeter wave communication system. The method would include not limited to: transmitting a time unit which may include a payload region and a downlink header region which may include a first beam quality measurement resource (BQMR) for a first scan beam and a second BQMR for a second scan beam. The first BQMR may include a first reference signal and the second BQMR may include a second reference signal; the first reference signal is for calculating a first signal quality measurement and the second reference signal is for calculating a second signal quality measurement; and one of at least the first scan beam or the second scan beam is selected based on comparing at least the first signal quality measurement and the second signal quality measurement; and receiving the first signal quality measurement which corresponds to the first scan beam via another time unit In one of the exemplary embodiment, the disclosure is directed to a base station (BS) which includes not limited to a transmitter which transmits signals in a millimeter wave (mmWave) frequency range, a receiver which receives signals in a millimeter wave (mmWave) frequency range, and a processor coupled to the transmitter and the receiver and is configured at least to: transmit, via the transmitter, a time unit which may include a payload region and a downlink header region which may include a first beam quality measurement resource (BQMR) for a first scan beam and a second BQMR for a second scan beam. The first BQMR may include a first reference signal and the second BQMR may include a second reference signal; the first reference signal is for calculating a first signal quality measurement and the second reference signal is for calculating a second signal quality measurement; and one of at least the first scan beam or the second scan beam is selected based on comparing at least the first signal quality measurement and the second signal quality measurement and receive the first signal quality measurement which corresponds to the first scan beam via another time unit In order to make the aforementioned features and advantages of the disclosure comprehensible, exemplary embodiments accompanied with figures are described in detail below. It is to be understood that both the foregoing general description and the following detailed description are exemplary, and are intended to provide further explanation of the disclosure as claimed.

It should be understood, however, that this summary may not contain all of the aspect and embodiments of the disclosure and is therefore not meant to be limiting or restrictive in any manner. Also the disclosure would include improvements and modifications which are obvious to one skilled in the art.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles of the disclosure.

FIG. 13 illustrates an example of a configurable frame structure for TDD in accordance with one of the exemplary embodiments of the disclosure.

DETAILED DESCRIPTION OF DISCLOSED EMBODIMENTS

Figure 1:
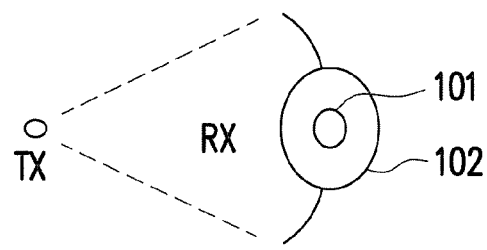
FIG. 1 illustrates an example of an mmWave aperture relative to a microwave aperture at a receiver.
Figure 2:
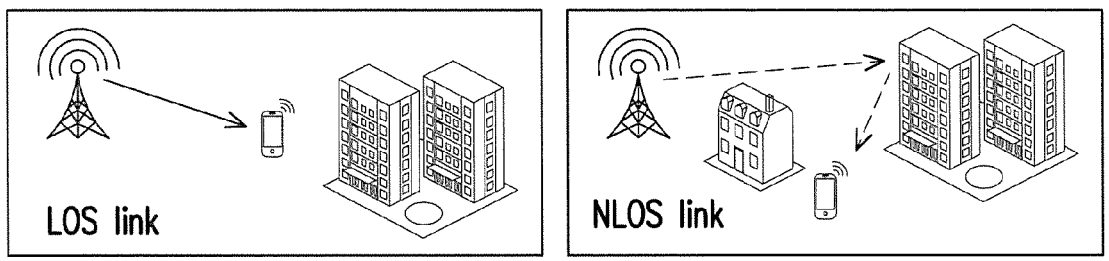
FIG. 2 illustrates a LOS environment relative to a NLOS environment.
Figure 3:
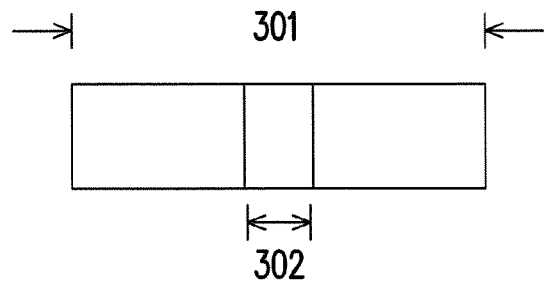
FIG. 3 illustrates noise bandwidth in mmWave band relative to noise bandwidth in microwave band.
Figure 4:
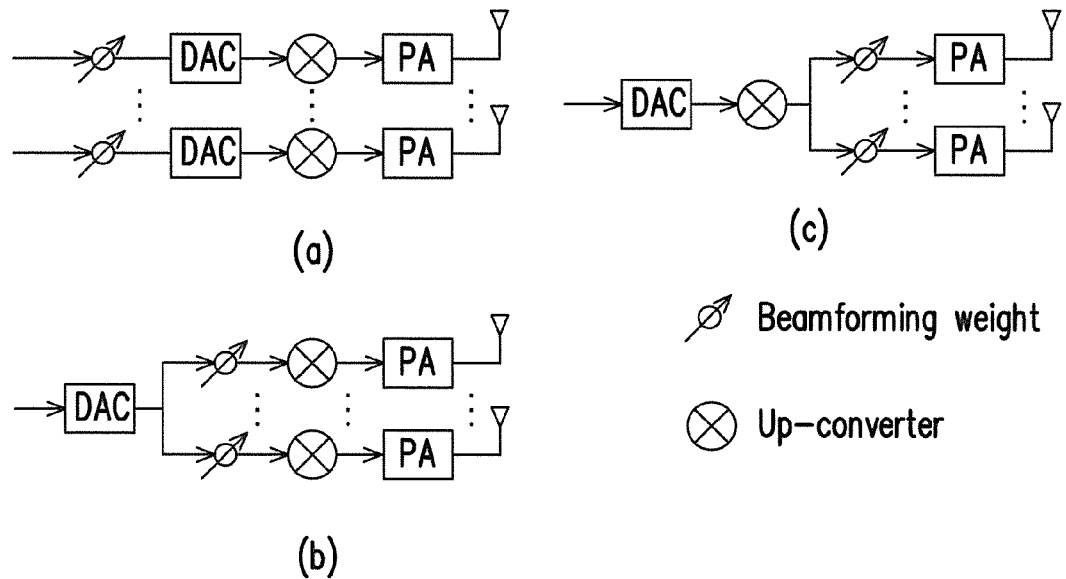
FIG. 4 illustrates various types of beamforming transmitters used in a wireless communication system.
Figure 5:
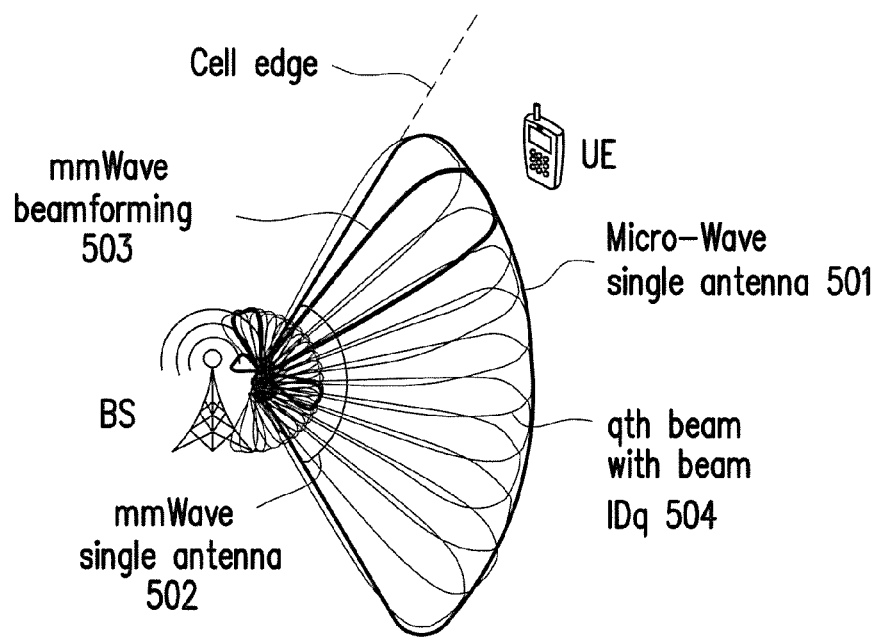
FIG. 5 illustrates examples of radiation patterns of different transmission wavelengths.
Figure 6:
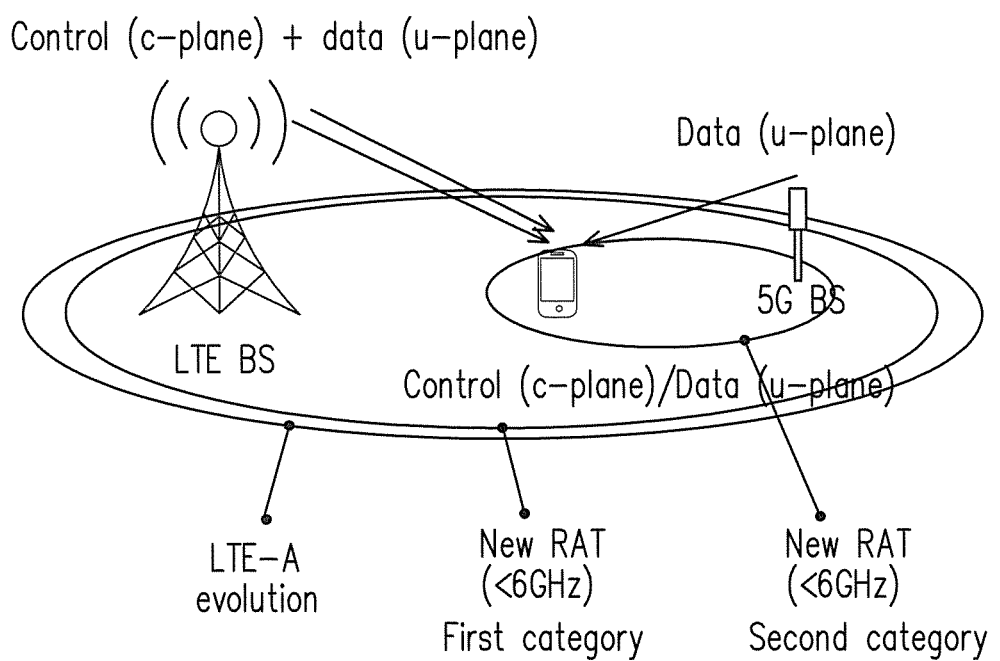
FIG. 6 illustrates an example of a multi-RAT communication system.
Figure 7:
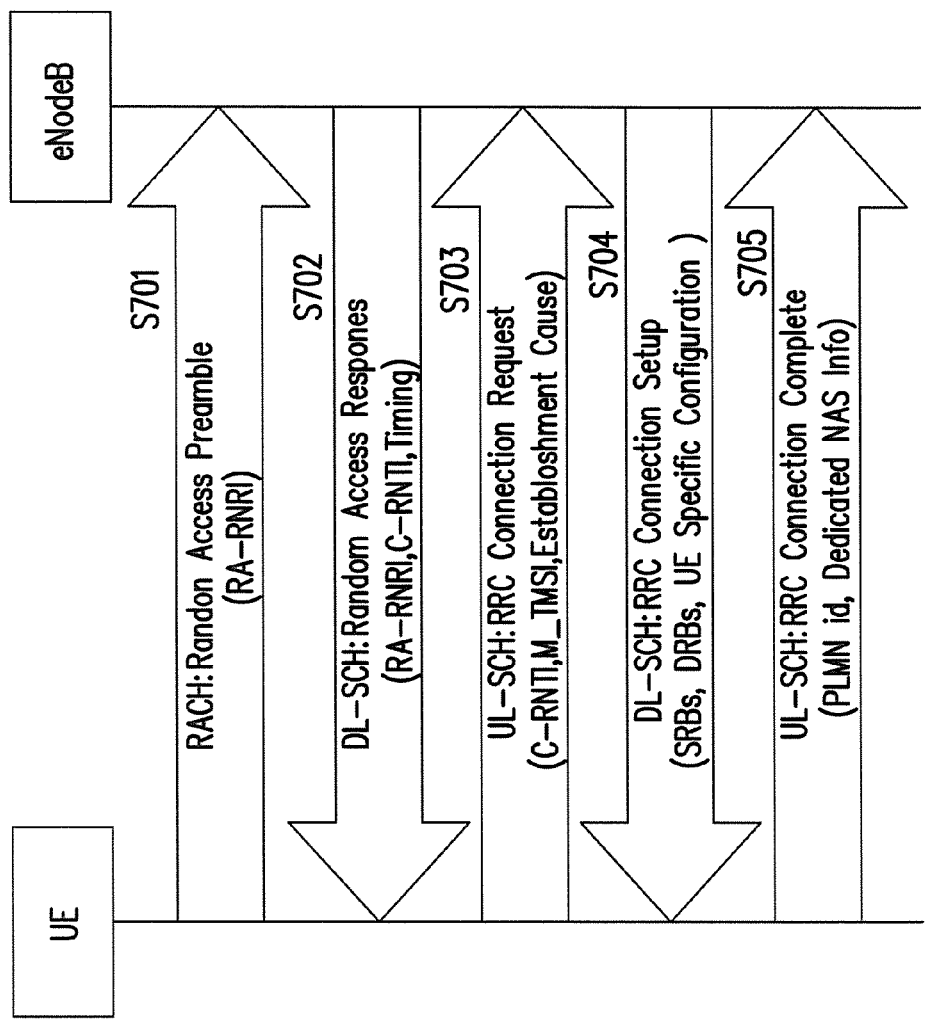
FIG. 7 illustrates a scheduling request procedure of a legacy communication system.

Reference will now be made in detail to the present exemplary embodiments of the disclosure, examples of which are illustrated in the accompanying drawings. Wherever possible, the same reference numbers are used in the drawings and the description to refer to the same or like parts.

The disclosure is directed to a network entry method of a millimeter wave communication system and related apparatuses using the same method. The disclosure proposes a time division duplexing (TDD) mmWave frame structure which includes a beamforming (BF) header and a payload (PL) region that follows the BF header. The BF header would include not limited to a downlink (DL) region and an uplink (UL) region. The BF header would provide functions not limited to (BS/UE) beam acquisition, automatic gain control (AGC), timing/frequency synchronization, cell identification, system information (SI) configuration and time advance setting for random access. During network entry, the UE beam acquisition could be performed based on autocorrelation of a beam search signal (BSS). Subsequently, timing could be detected, and AGC could be set after the best UE beam has been detected. Then, the AGC could be fixed, and the BS beam acquisition could be accomplished. The AGC could be then maintained and frequency offset could be detected while best BS beam detected. Next, cell identification could be performed, and SI could be obtained. Also the timing advance (TA) could be set for random access (RA).

Figure 8:
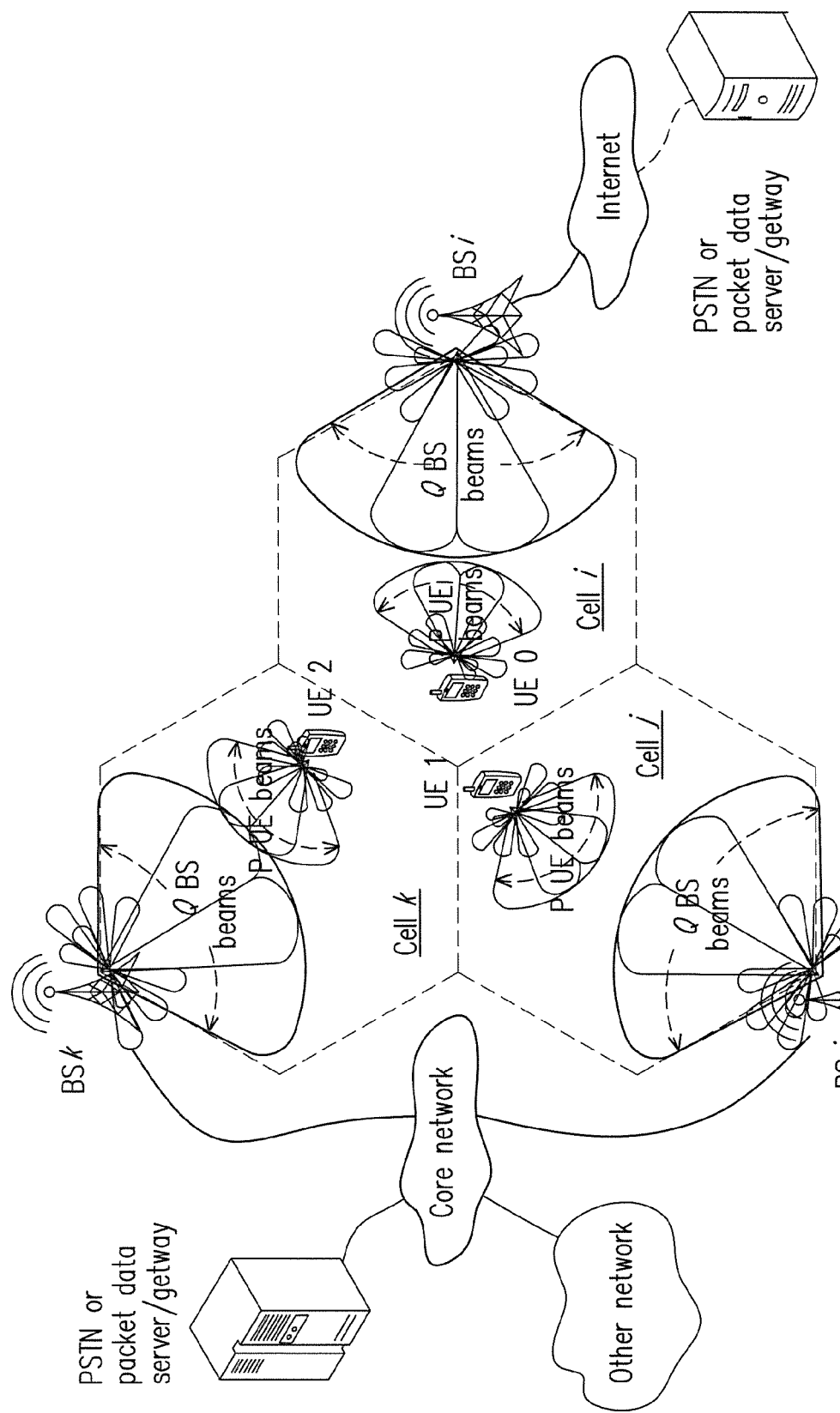
FIG. 8 illustrates an example of an mmWave communication system in accordance with one of the exemplary embodiments of the disclosure.

FIG. 8 illustrates an example of an mmWave communication system. Referring to FIG. 8, an mmWave wireless communication would include one or more cells (e.g. Cell i, Cell j, Cell k) with each of which under the coverage of a base station (BS) (e.g. BS i, BS j, BS k) and one or more mobile stations (MSs) (or user equipment (UEs)) with each of which served by at least one BS. It could be assumed that multiple antennas would be used by the BSs and UEs so that beamforming capability is available to both the BSs and UEs. For simplicity, it is assumed that Q beams are used by BSs, and P beams are used by the UEs. The data packets and various signals could thus be transmitted from and/or received by the BSs and/or UEs via the Q beams and P beams, respectively. The mmWave wireless communication system may also include a number of public switched telephone networks (PSTNs), packet data servers/gateways, and mobility management gateways (MMEs). The BSs may connect to at least one PSTN or a packet data server/gateway by using the X2 interface through one or more (core) networks or the internet. Upon receiving any one of the Q beams, the UE may determine the beam ID(s) which correspond to one of the Q beams received. The beam ID(s) embedded in beam search signal(s) (BSS(s)) could be transmitted via BS scan beam(s). It should be noted that the cells (e.g. Cell i, Cell j, Cell k) may use the same set of beam IDs.

Figure 9:
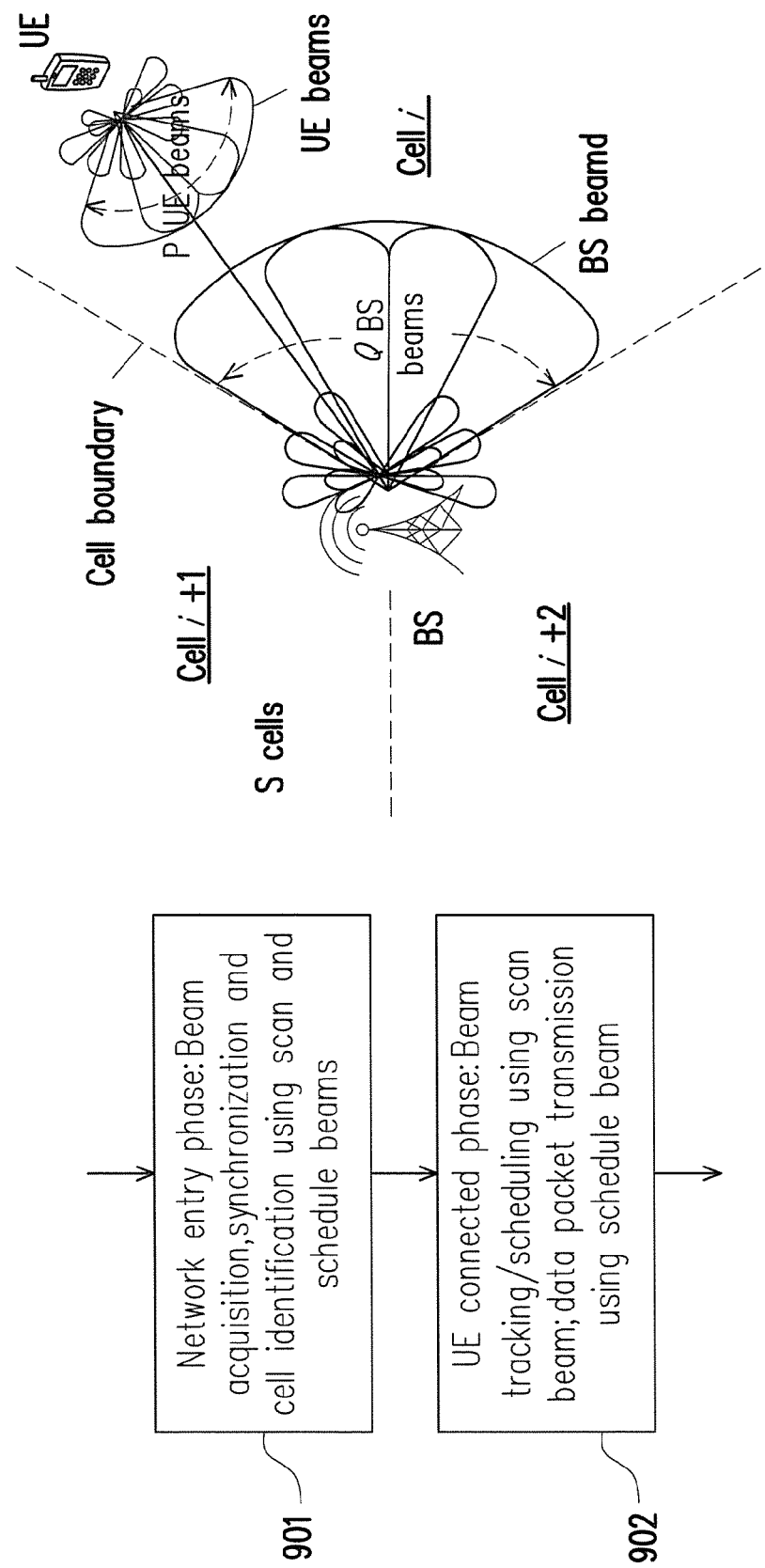
FIG. 9 illustrates an mmWave communication process for the second category of mmWave communication system in accordance with one of the exemplary embodiments of the disclosure.

FIG. 9 illustrates an mmWave communication process for a communication system that only uses mmWave RAT (second category). For the proposed mmWave wireless communication system, there could be at least two main phases. The first phase is the network entry phase 901, and the second phase is the UE connection phase 902. For the network entry phase 901, beam acquisition, time/frequency synchronization and cell identification (including cell search) could be accomplished by using both BS 'scan' (or called control) beams and 'schedule' (or called data) beams during the network entry procedure. A UE is in the network entry phase 901 when the UE powers on, obtains system information of a cell to connect to, and performs random access procedure. After the random access procedure has been completed, the UE may enter the UE connected phase 902. For the UE connected phase 902, beam tracking/scheduling could be accomplished by using only the BS scan beam, and thus data packet transmission by using BS schedule beams could then be accomplished when the UE has been connected.

Figure 10:
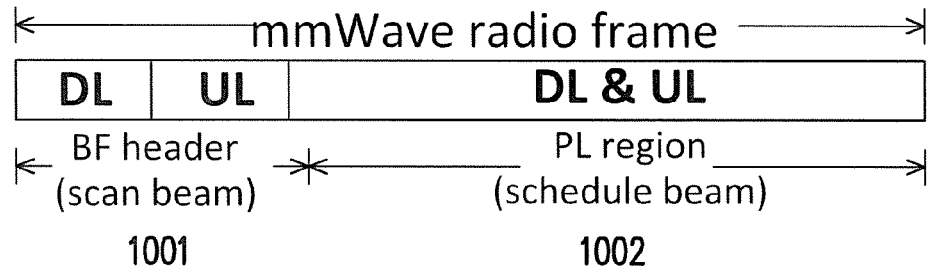
FIG. 10 illustrates a configurable frame structure of an mmWave communication system in accordance with one of the exemplary embodiment of the disclosure.

FIG. 10 illustrates a frame structure of an mmWave communication system in accordance with one of the exemplary embodiments of the disclosure. The frame structure would include not limited to a beamforming (BF) header region 1001 and a payload (PL) region 1002. The BS scan beams and BS schedule beams could be respectively used in BF header 1001 and the PL region 1002. Beam acquisition, beam tracking, cell identification (including cell search) and synchronization could be performed in BF header 1001 by using the BS scan beams. Beam scheduling for DL/UL packet data transmission could be performed in the PL region 1002 by using the BS schedule beams.

Figure 11:
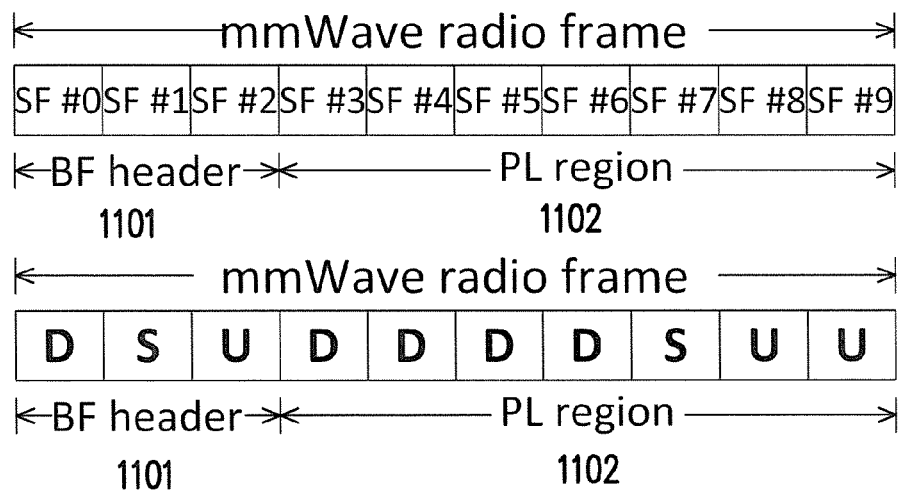
FIG. 11 illustrates an example of LTE TDD based mmWave radio frame according to exemplary embodiment of the disclosure.

FIG. 11 illustrates an example of LTE TDD based mmWave radio frame according to exemplary embodiment of the disclosure. An mmWave radio frame could be demarcated into ten subframes (SFs) or any number of arbitrary subframes. In the example of FIG. 11, the first 3 subframes or so could belong to the BF header 1101 and may generally include a DL and/or a UL and/or a special subframe. The remaining 7 subframes or so would belong in the PL region 1102 and may also include the DL and/or UL and/or special subframes which could be configurable by the network or the BS. Also in the example of FIG. 11, D, S, and U denotes the DL, special and UL subframes, respectively. Note that S may follow by D and precede U when D is switched to U, but S would typically be absent when U is switched to D.

Figure 12:
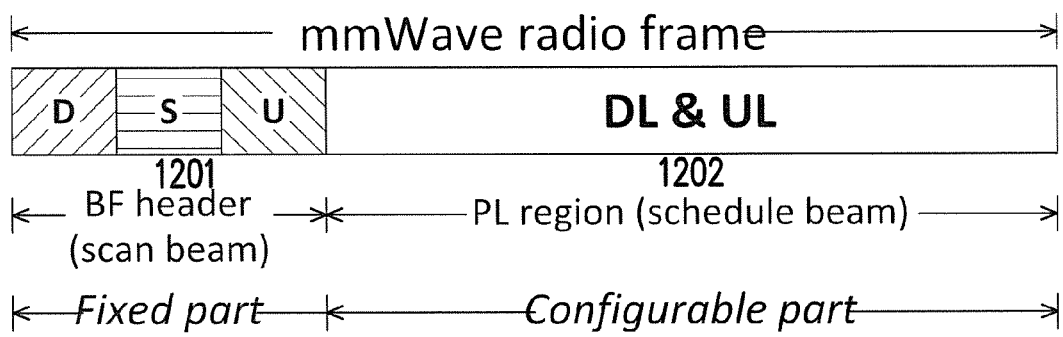
FIG. 12 illustrates a configurable frame structure for TDD in accordance with one of the exemplary embodiments of the disclosure.

FIG. 12 illustrates a configurable frame structure for TDD in accordance with one of the exemplary embodiments of the disclosure. For this exemplary embodiment, the BF header 1201 could be structurally fixed and contain, for example, a D, S, and U. However, the remaining 7 subframes contained in the PL region 1202 could be configurable according to the user requirements, channel conditions and/or network capability. This would mean that, for example, if any of the 7 subframes has been assigned as a DL subframe, this DL subframe could be changed to an UL subframe or a special subframe by the network or the BS.

FIG. 13 illustrates an example of a configurable frame structure for TDD in accordance with one of the exemplary embodiments of the disclosure. A lookup table could be stored in memory and records various DL-UL configurations. This table would be similar to the current LTE DL-UL configuration table, but a frame would be divided into a BF header region followed by a PL region. The BF header would contain a number of BF header subframes such as three in this example, and the PL region would contain a number of PL region subframes.

Figure 14:
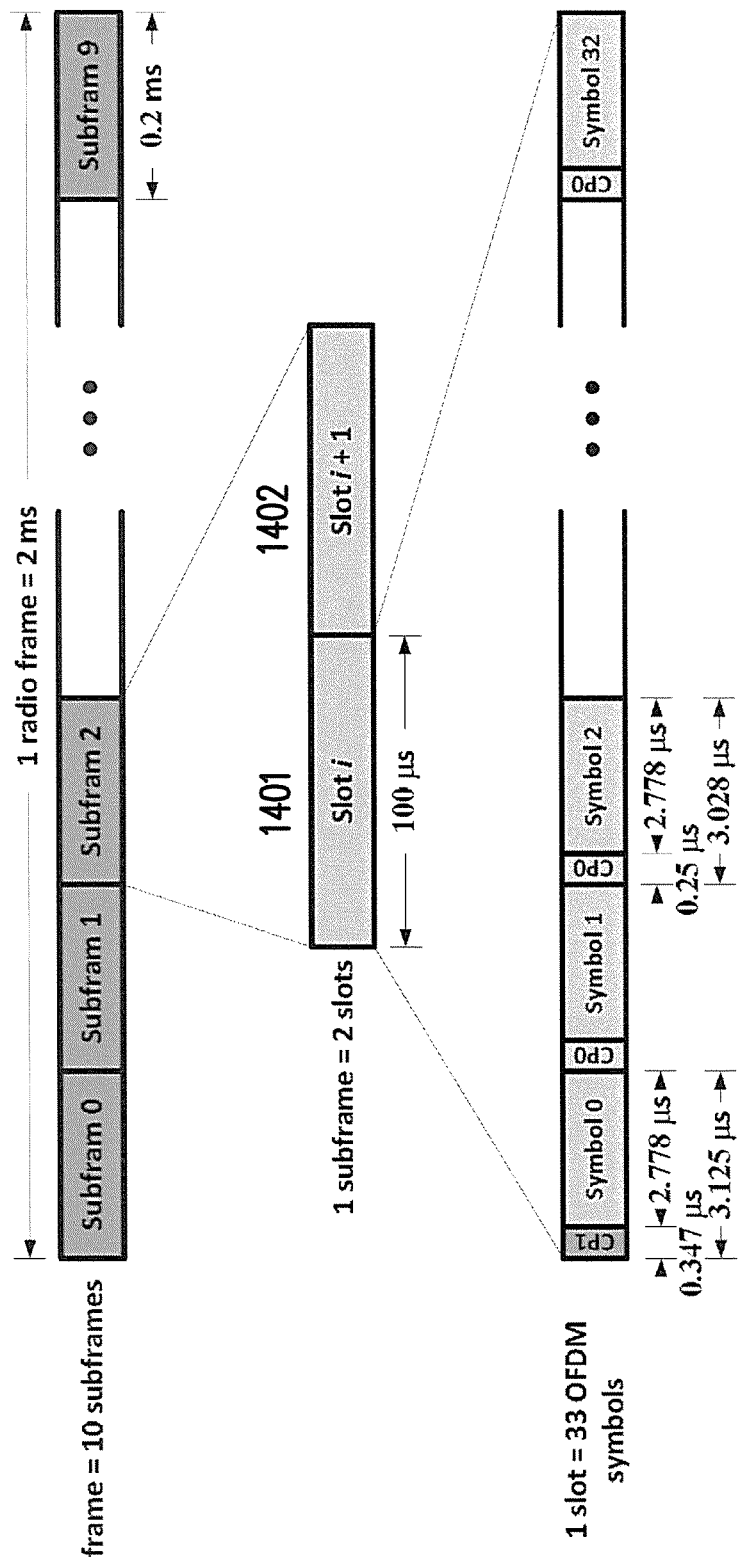
FIG. 14 illustrates an example of LTE based TDD mmWave frame structure in accordance with one of the exemplary embodiments of the disclosure.

FIG. 14 illustrates an example of LTE based TDD mmWave frame structure in accordance with one of the exemplary embodiments of the disclosure. In this exemplary embodiment, an mmWave radio frame having a duration of 2 ms could be partitioned into 10 sub-mmWave frames or 10 subframes, and each of the subframes having a duration of 0.2 ms may have 2 time slots (e.g. 1401 1402) and each time slot (e.g. 1401) could be further partitioned into 33 OFDM symbols. The cyclic prefix (CP) lengths of the first OFDM symbol, which could be 0.347 microseconds (μs) for example, could be different from the remaining OFDM symbols, which could be 0.25 μs for example, in each of the two slots. It should be apparent to ordinary persons skilled in the art that the duration and number of each subframe, slot, and symbol may vary according to different design considerations.

Figure 15:
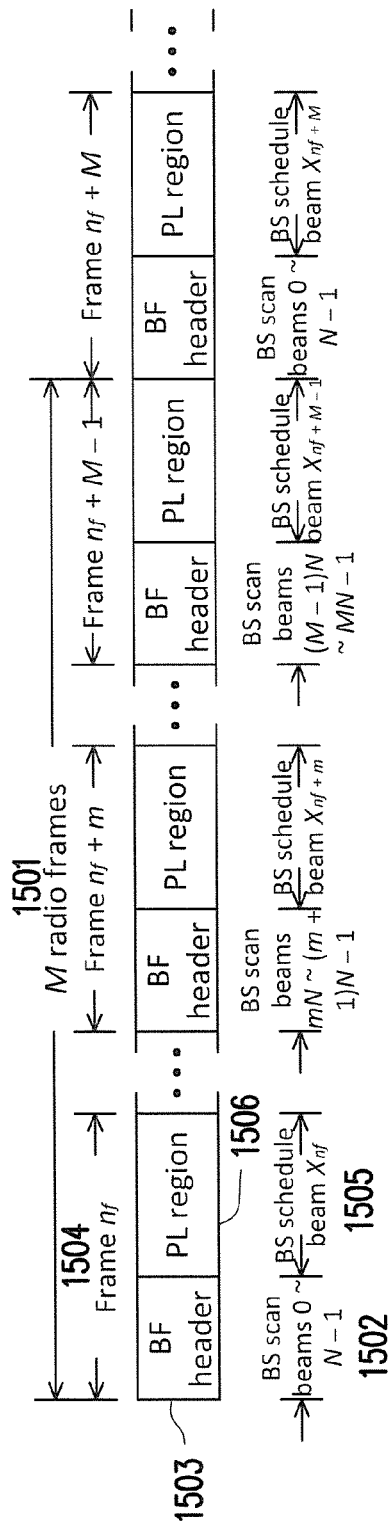
FIG. 15 illustrates mmWave frames to carry beamforming information in accordance with one of the exemplary embodiments of the disclosure.

FIG. 15 illustrates using mmWave frames to carry beamforming information in accordance with one of the exemplary embodiments of the disclosure. Assuming that a BS is transmitting Q scan beams having Q different sequences with each beam having a different ID, and thus there would be Q different IDs. It is also assumed that the Q scan beams could be deterministically defined and sequentially transmitted over M mmWave radio frames (e.g. 1501), and each BF header (e.g. 1503) of a radio frame (e.g. 1501) would be allocated with N scan beams where N=Q/M. The allocation of the Q beams may repeat every M mmWave radio frames. The parameter 'M' in this exemplary embodiment could be a beacon period of the Q BS scan beams. Thus, BS scan beams mN~(m+1)(N−1) could thus be transmitted in BF headers in frame $n_{f+m}$, where m=0, 1, 2, and etc. In this exemplary embodiment, the BS scan beams 0~N−1 (e.g. 1502) could be transmitted in BF header 1503 in frame $n_f$ 1504, BS scan beams N~2N−1 (e.g. 1505) could be transmitted in BF header in frame $n_{f+1}$, and so on. On the other hand, for the schedule beams in the PL region 1506 for this exemplary embodiment, only one of the Q schedule beams could be arbitrarily scheduled and selectively transmitted by a BS over a predetermined time duration according to the user requirements, channel conditions, network capability, and so forth.

Figure 16:
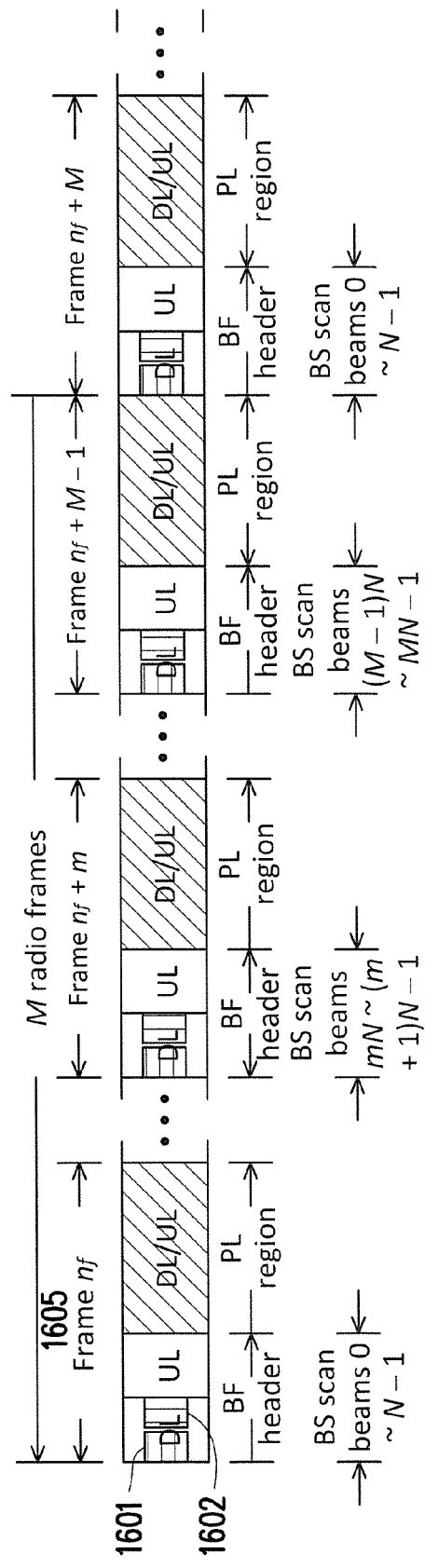
FIG. 16 illustrates transmitting periodic signaling via scan beams in accordance with one of the exemplary embodiments of the disclosure.

FIG. 16 illustrates transmitting periodic signaling via scan beams in accordance with one of the exemplary embodiments of the disclosure. The periodic signaling has a beacon signaling like behavior and is transmitted from a BS to at least one UE. FIG. 16 shows that within each mmWave radio frame such as frame $n_f$ 1605, 'beam search signal (BSS)' 1601 and 'cell search signal (CSS)' 1602 could be allocated in the BF header and transmitted via scan beams from a BS to the at least one UE. The BSS 1601 assigned with a beam ID with a beacon period of M frames could be used for beam acquisition or could be used for beam search in network entry mode (phase) 901, beam tracking (i.e. beam search for data transmission in UE connection mode (phase) 902) and timing/frequency synchronization. The CSS 1602 assigned with a cell ID with a beacon period of one frame could be used for cell identification and timing/frequency synchronization (if needed). The BSS 1601 and CSS 1602 may have different sequence formats which means that the generation of the beam sequences would be independent of the generation of the cell sequence. Also as previously described, each cell could have Q BS beams and the same set of Q beam sequences.

Figure 17:
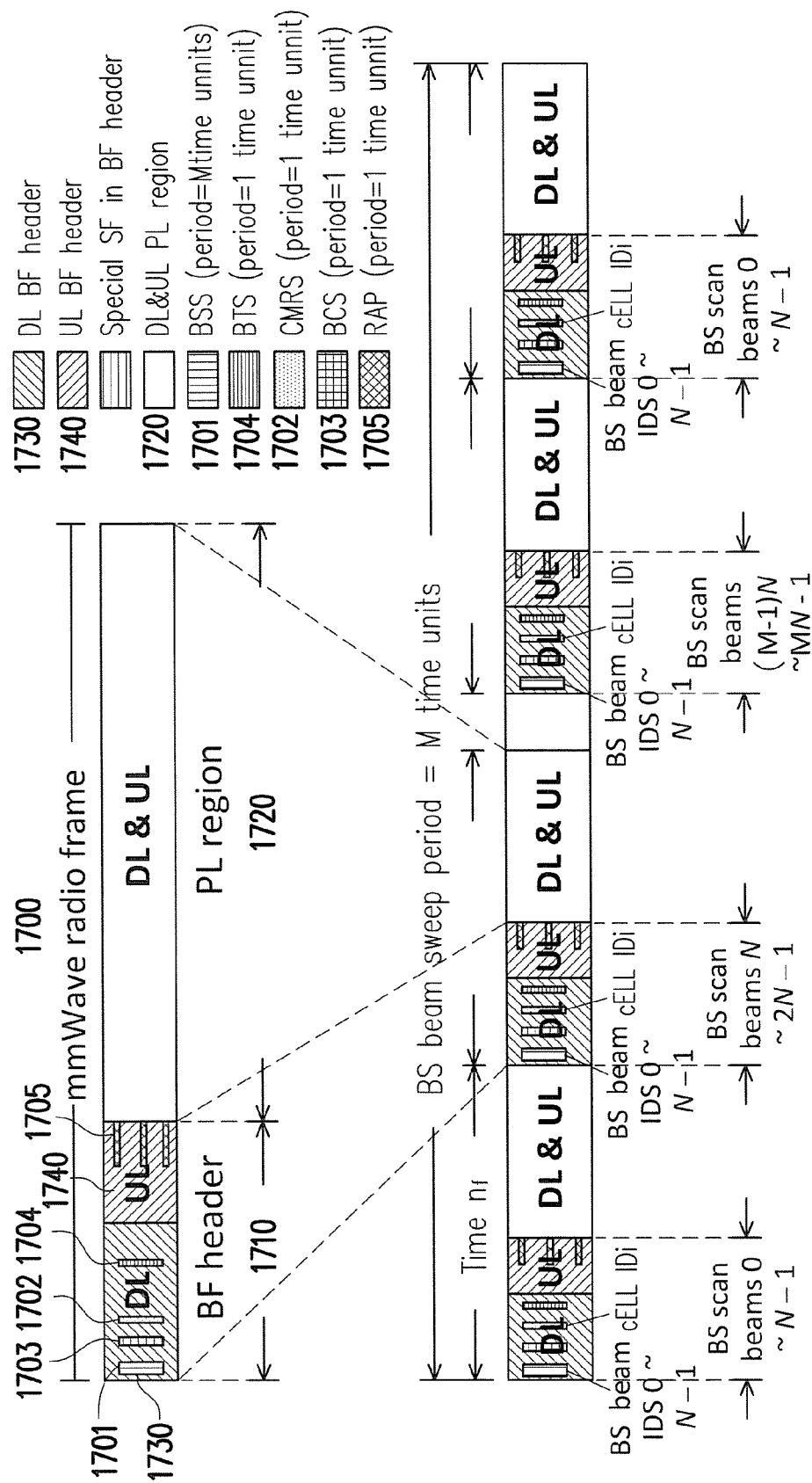
FIG. 17 illustrates an exemplary mmWave frame structure used during a network entry phase in accordance with one of the exemplary embodiments of the disclosure.

FIG. 17 illustrates an exemplary mmWave frame structure used during a UE connection phase in accordance with one of the exemplary embodiments of the disclosure. For this exemplary embodiment, a number of periodic signals could be allocated and transmitted in a BF header 1710 by using scan beams transmitted from a BS to a UE during the network connection phase. Each mmWave time unit (e.g. 1700) could be in a frame, a subframe, a time slot, one or more OFDM symbols, and so forth. For this exemplary embodiment, the repeating mmWave frame structure of a single mmWave time unit 1700 would include not limited to a BF header 1710 transmitted via scan beams sequentially sweeped by the BS and a PL region 1720 transmitted via schedule beams scheduled by the BS. The BF header 1710 would include not limited to a DL BF header 1730 and a UL BF header 1740. The DL BF header 1730 would include not limited to a BSS 1701, a cell specific reference signal (CRS) 1702, a BCS 1703, and a beam tracking signal (BTS) 1704. The UL BF header 1740 would include not limited to a RAP 1705.

The BSS 1701 in this exemplary embodiment is denoted as $S_{BSS,q}$, $0 \leq q \leq Q-1$, where the beam ID q could be transmitted by the BS in DL BF header 1730 via the BS scan beam q every M frames to UE for purposes including a BS beam ID detection for beam acquisition, for automatic gain control (AGC), and for time or frequency synchronization. The property of the BSS would include repetitions in the DL BF header 1730 in the time domain or down-sampling in the frequency domain. The same set of Q BBS's could be reused across multiple cells by different BSs.

The CRS 1702 is denoted as $s_{CRS,i}$, $0 \leq i \leq S-1$, where the cell ID i could be time division multiplexing (TDM), frequency division multiplex (FDM), code division multiplexing (CDM), or a combination of the above and transmitted by a BS in a DL BF header 1730 via a BS scan beam in every frame to a UE for cell link monitoring for purposes such as determining handover. The cell ID included in the CRS 1702 could be used for cell identification.

The broadcast signal (BCS) 1703 denoted as $s_{BCS}$ could be transmitted by the BS in DL BF header 1730 via the BS scan beam every frame to UE for system information detection (e.g. for system bandwidth configuration or for TDD DL/UL configuration for PL region 1720, or so forth).

The random access preamble (RAP) 1705 is a non-contention based RAP denoted as $s_{RAP}$ which could be transmitted by a UE in a UL BF header (e.g. 1740) via a (best) BS scan beam every mmWave time unit 1700 to the BS for TA maintenance.

The BTS 1704 in this exemplary embodiment is denoted as $s_{BTS,q}$, $0 \leq q \leq Q-1$, where beam ID q could be transmitted by a BS to a UE in a DL BF header 1730 via a BS scan beam q every M frames for UE beam and BS beam tracking. For this exemplary embodiment, BTS 1704 is used by UE for beam tracking after a network entry has been established, and thus the generation of BTS 1704 is independent from a BSS 1701. Even though BSS could potentially be used by UE for beam tracking, it would be typically be faster to use BTS 1704 by UE for beam tracking than by using a BSS. Upon measuring a BTS 1704, a UE may know the signal quality of a corresponding BS beam by performing a reference signal received power (RSRP) measurement which may include a signal to noise (SNR) ratio measurement, a signal to interference plus noise ratio (SINR) measurement, or a received signal strength indicator (RSSI) measurement upon the BTS 1704. BTSs could be allocated, similar to a beam quality measurement resource (BQMR) signal, in a distributed manner and localized manner which are shown in FIG. 18.

Figure 18:
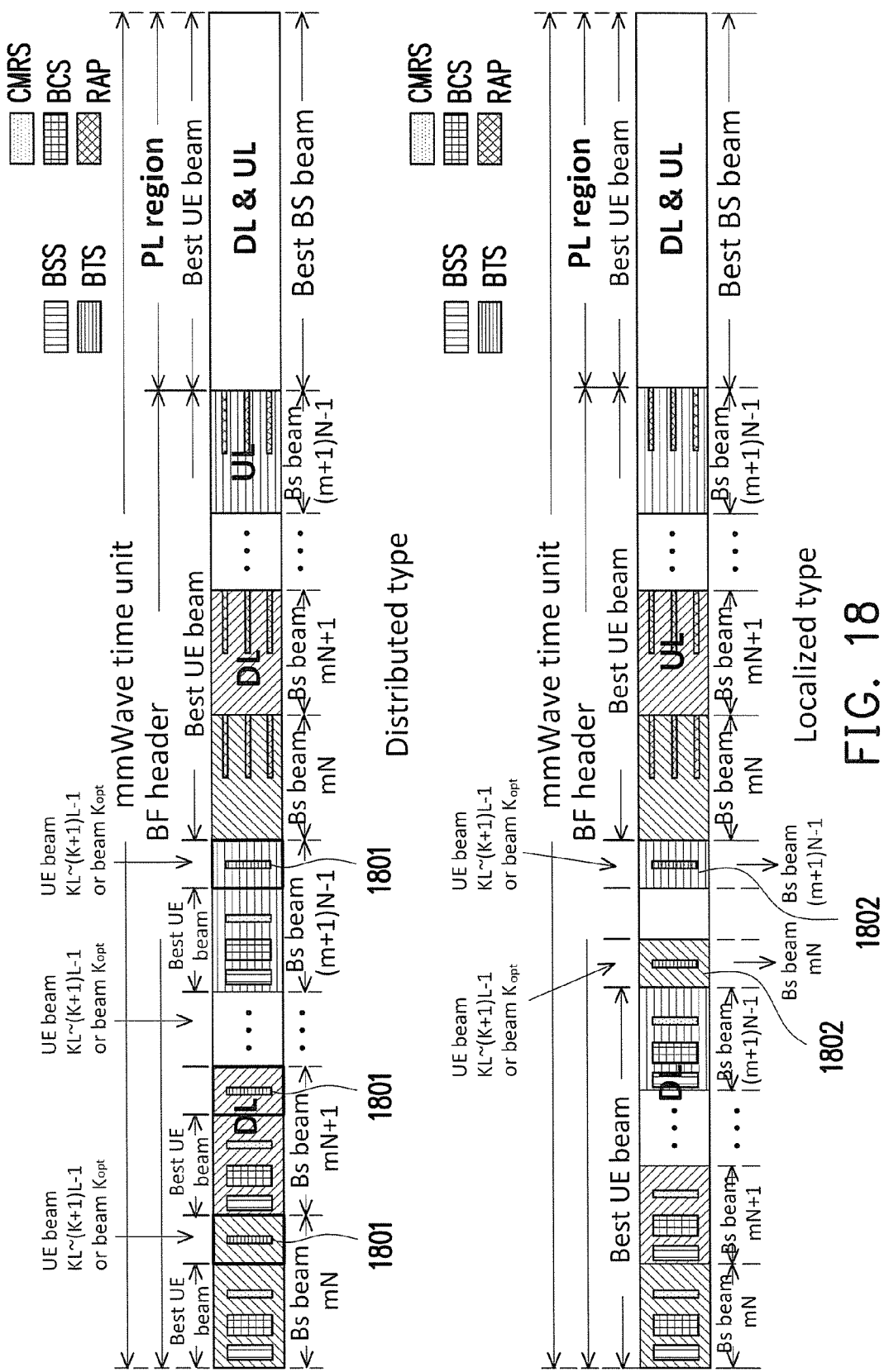
FIG. 18 illustrates the allocation of BQMR signals in accordance with one of the exemplary embodiments of the disclosure.

FIG. 18 illustrates the allocation of BQMR signals in accordance with one of the exemplary embodiments of the disclosure. For exemplary embodiment, an mmWave time unit 1700 may further include a plurality of BQMRs in a DL BF header 1710 as each BQMR correspond to a different one of the Q BS beams. In general, a BQMR is located in a DL BF header 1710 to be received by a UE as the UE sequentially sweeps its beams. The sweeping of the beams of the UE could be unknown to any BS, and multiple BS scan beams could be used per UE scan beam transmission. The UE may then obtain a reference signal from the BQMR and subsequently perform measurement of the beam quality of the one of the Q BS beams corresponding to the BQMR. Each of the BQMR may contain a BTS for tracking the best BS beam and the best UE beam. The above described reference signal in BQMRs could be the BTS 1704. In this way, the UE would be able to track the quality of BS beams and use a different BS beam based on the measurements of the reference signal within the BQMR.

There could be two BQMR types in a DL BF header 1710 for BS and UE beam tracking. The allocation of BQMRs could each be distributed or localized. Distributed BQMRs 1801 are alternatively located within a DL FB header 1710 if L>1. It can be seen from FIG. 18 that the BQMRs of distributed types are grouped with other signals (e.g. 1701, 1702, 1703, 1704, and etc.) based on correspondence with the same BS beam and are separated from each other by other signals. The BQMR of localized types 1802 are consecutively allocated within a DL FB header 1710 if L>1. It can be seen from FIG. 18 that the BQMRs of localized types are not grouped with other signals (e.g. 1701, 1702, 1703, 1704, and etc.) based on correspondence with the same BS beam but instead are grouped together with other BQMRs which correspond to other BS beams. In other words, BQMR of distributed types are not consecutive from one another; and whereas BQMR of localized types are consecutive from one another. For example, suppose that a downlink header region of an mmWave time unit has at least the first BQMR and the second BQMR, the first BQMR and the second BQMR are not adjacent to each other and are distributed throughout the downlink header region for distributed types; whereas the first BQMR and the second BQMR are adjacent to each other and are allocated within a particular section of the downlink header region for localized types.

Figure 19:
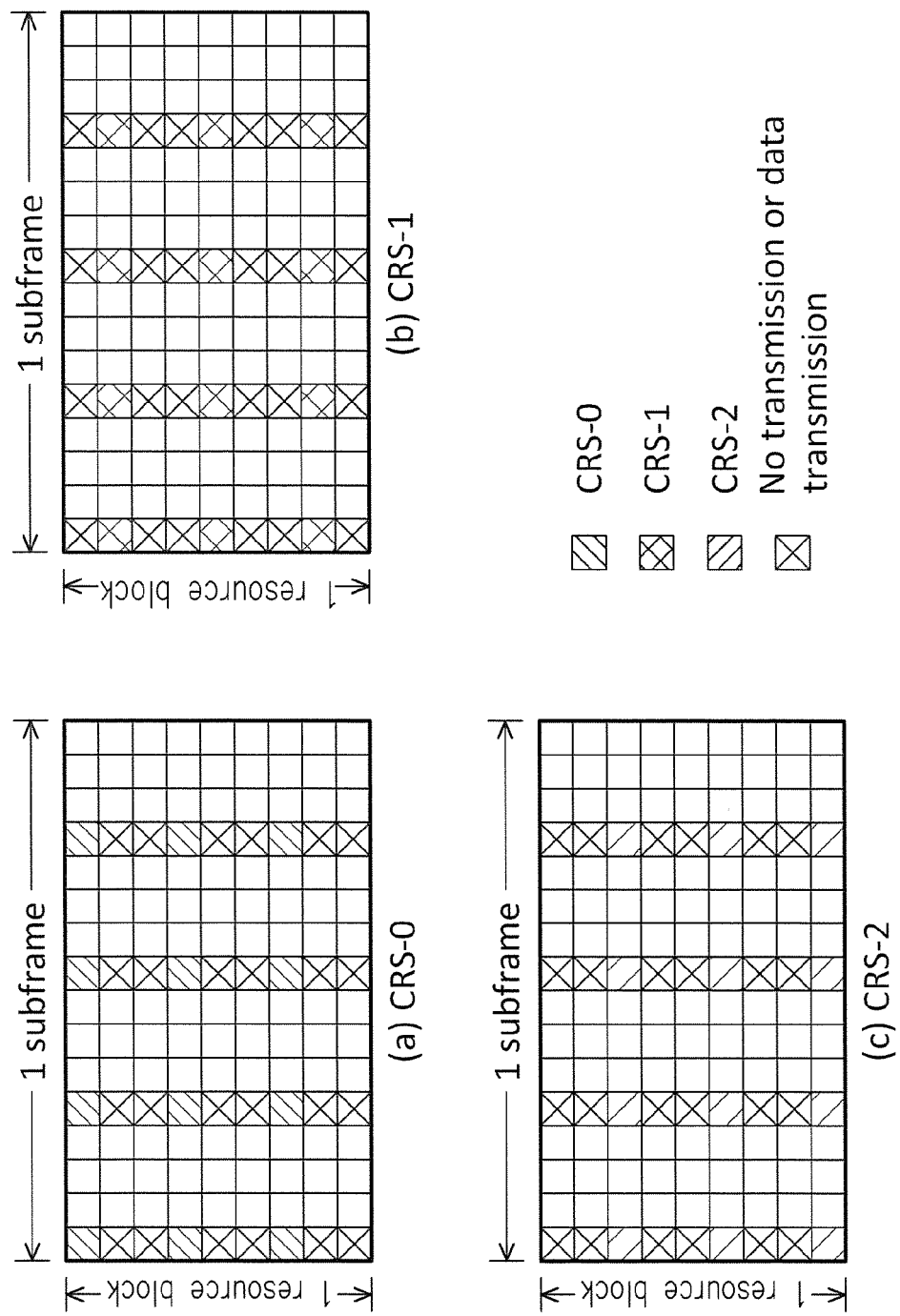
FIG. 19 illustrates FDM based CRS over one resource block (RB) in accordance with one of the exemplary embodiments of the disclosure.
Figure 20:
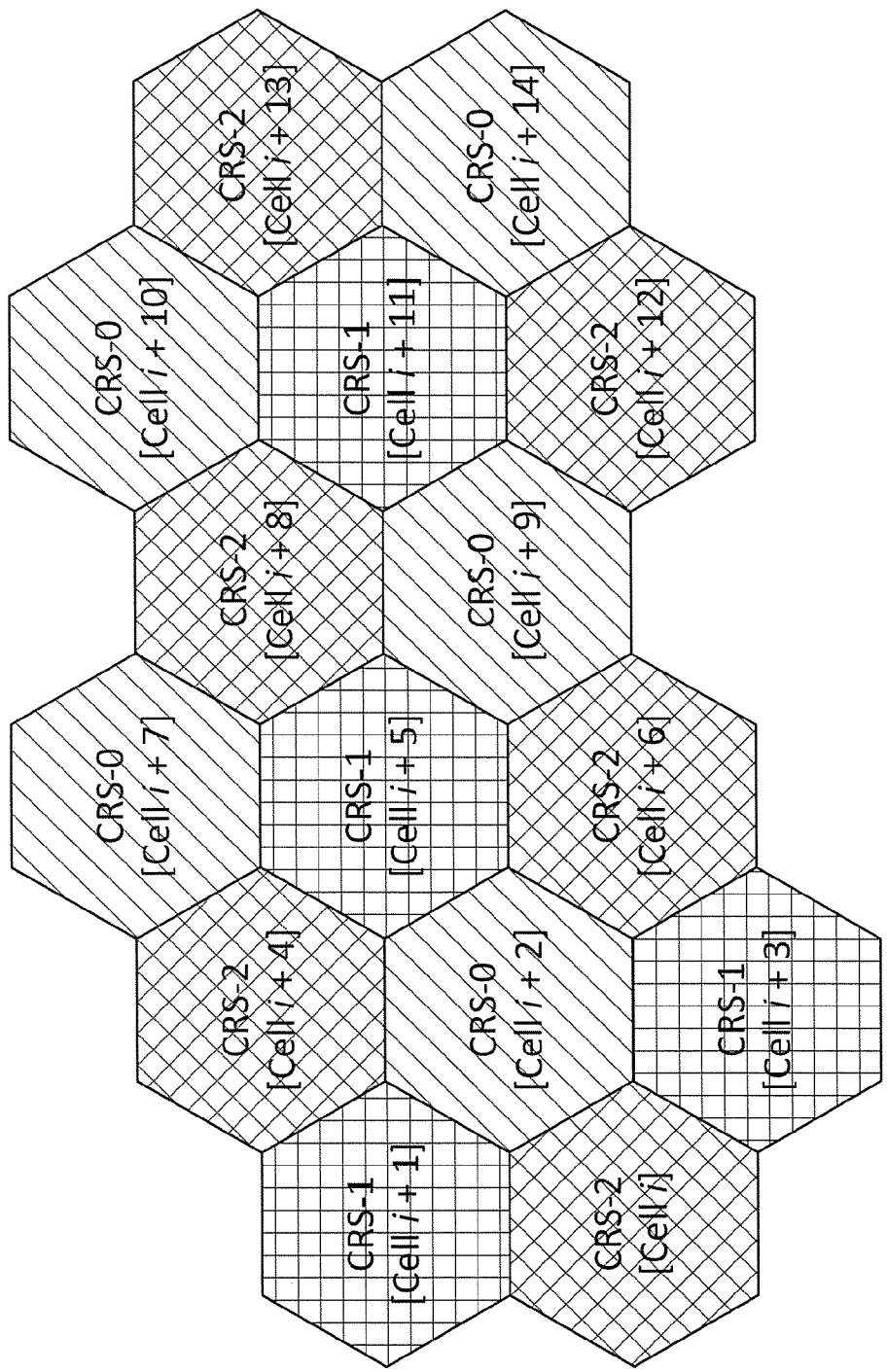
FIG. 20 illustrates CRS deployment over cells in cellular communications in accordance with one of the exemplary embodiments of the disclosure.

FIG. 19 illustrates FDM based CRS over one resource block (RB) in accordance with one of the exemplary embodiments of the disclosure. In this exemplary embodiment, three specific CRSs which are used for three different cells could be multiplexed in frequency domain which is similar to the LTE's design mechanism. For a specific cell, although there could be six cells neighboring to a cell, only three CRSs might be used for these cells. In particular FIG. 19 shows three CRSs: (a) CRS-0, (b) CRS-1, and (c) CRS-2, and each of which is FDM based over one resource block. FIG. 20 illustrates CRS deployment over cells in cellular communications in accordance with one of the exemplary embodiments of the disclosure. Accordingly, the link quality could be obtained based on the signal to noise (SNR) measurements of three CRSs, and each of the CRS could be configured with a specific cell ID which could be monitored for possible handover.

Figure 21:
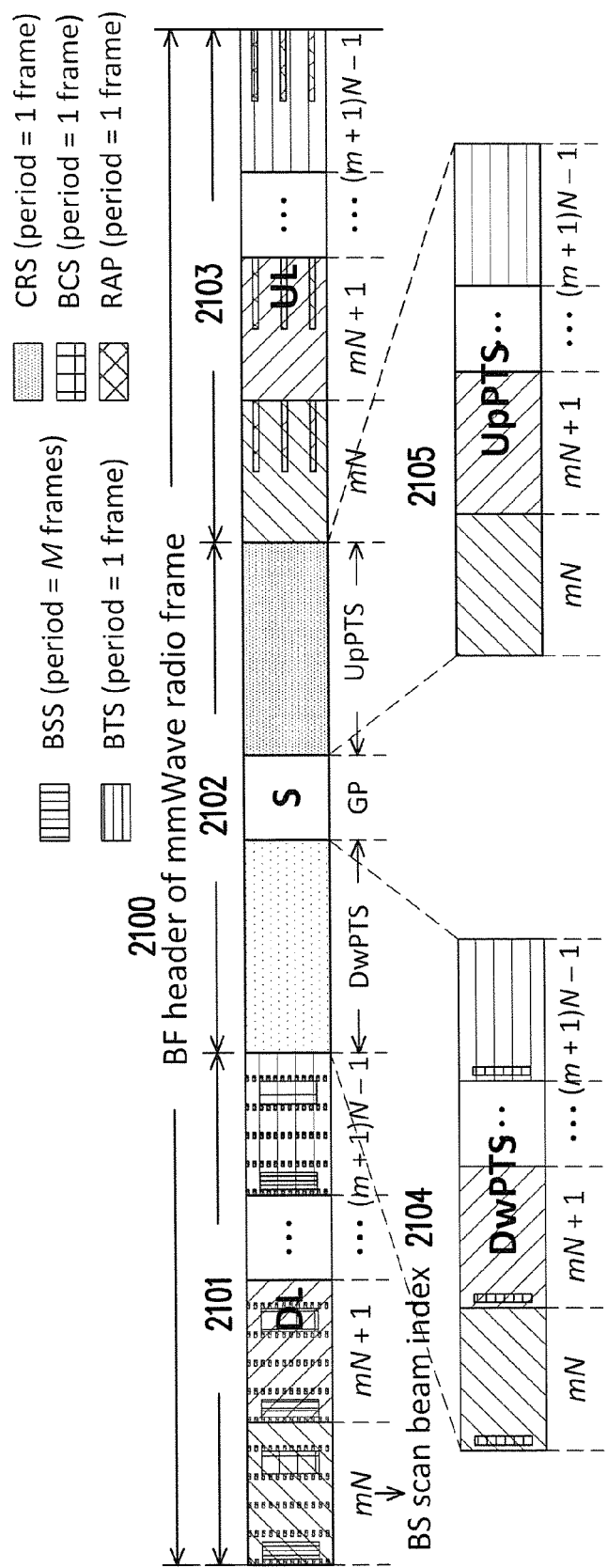
FIG. 21 illustrates a BF header in accordance with one of the exemplary embodiments of the disclosure.

FIG. 21 illustrates a BF header in accordance with one of the exemplary embodiments of the disclosure. Besides allocating BSS, CRS, BCS, and BTS in a DL BF header (e.g. 1730), these signals may also be allocated in a DL special subframe and started from any of the BS scan beams. Referring to FIG. 21 which shows a BF header 2100 of an mmWave radio frame, the BF header 2100 may include not limited to a DL BF header 2101, a special subframe 2102, and an UL BF header 2103. An RAP could be allocated in an UL BF header 2103 or be allocated in UL portion of the special subframe 2102 and started from any of the BS scan beams. Multiple BS scan beams could be periodically and sequentially swept by the BS. The number of BS scan beams in a DL BF header 2101 and the UL BF header 2103 could be the same. However, the number of scan beams used in a DL (i.e. downlink pilot time slot, DwPTS) transmission of special subframe 2104 or UL (i.e. uplink pilot time slot, UpPTS) transmission of special subframe 2105 could be either the same or different from the number of scan beams in a DL BF header 2101 or in a UL BF header 2103.

It is worth noting that a guard period (GP) is needed for DL-to-UL switch. The DL BF header 2101 or the UL BF header 2103 could be partitioned into N zones, mN~(m+1)N-1, where $0 \leq m \leq M-1$, each of the N zones could be transmitted via a unique one of N BS scan beams if N BS scan beams are used per DL BF header 2101 or the UL BF header 2103. In such case, BSS, CRS, BCS, and BTS could be transmitted in each of the N zones of the DL BF header 2101 and RAP could be transmitted in each of N zones of the UL BF header 2103. The (mN+n)th BSS with BS beam ID (mN+n) could be transmitted via the (mN+n)th one of the Q BS scan beams, where $0 \leq m \leq M-1$, $0 \leq n \leq N-1$ and $MN=Q$.

Figure 22:
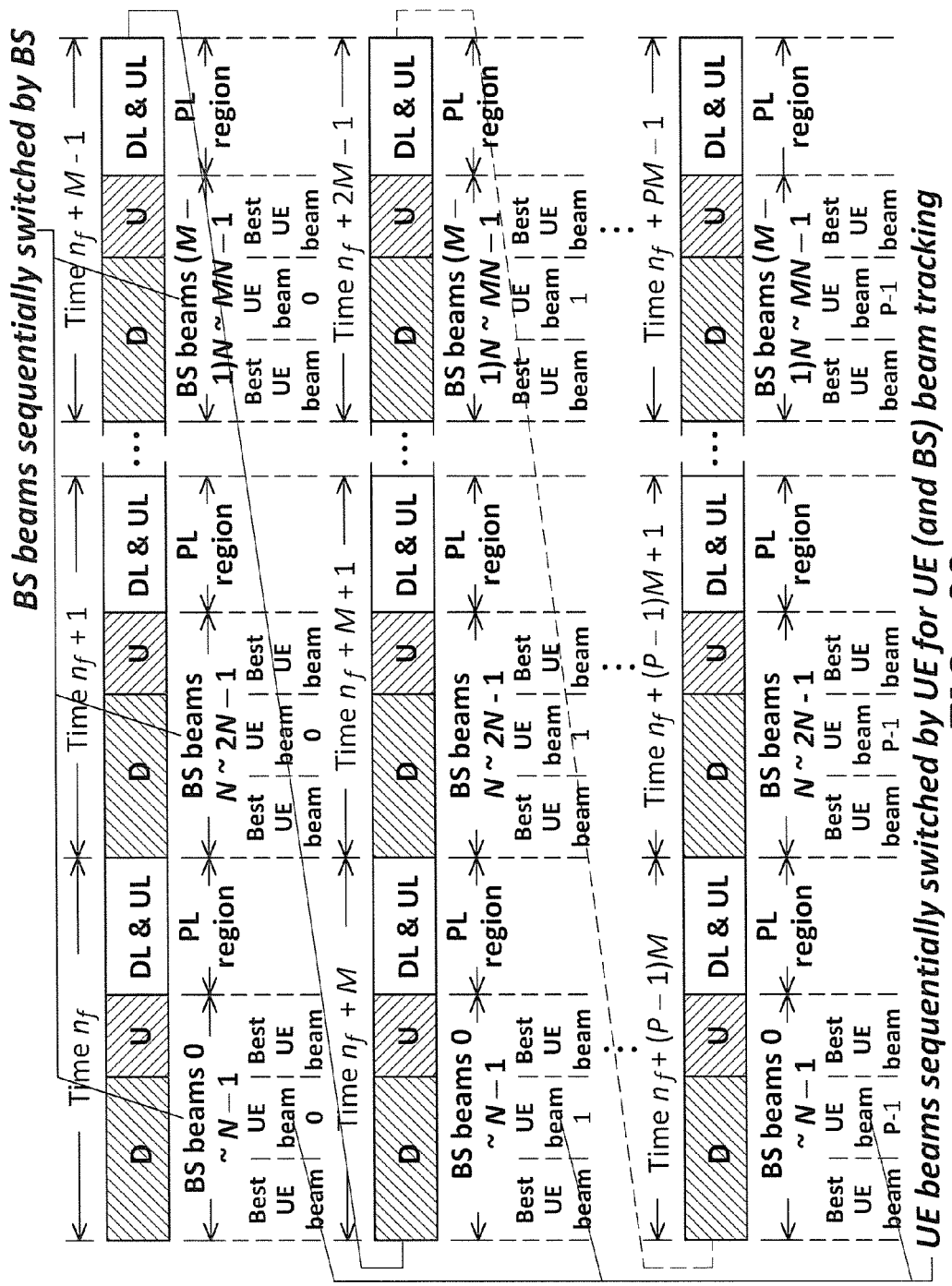
FIG. 22 illustrates beam sweep for BS beam and UE beam tracking during the UE connecting phase in accordance with one of the exemplary embodiments of the disclosure.

FIG. 22 illustrates beam sweep for BS beam and UE beam tracking during the UE connecting phase in accordance with one of the exemplary embodiments of the disclosure. For this exemplary embodiment, a BS would perform scan beam sweeps (of Q BS beams) and a user equipment would perform scan beam sweep (of P UE beams) for beam tracking during the UE connection phase. After a network entry procedure has been completed, a UE could be mobile and move around within a network. Thus, the mobility of the UE, the best BS beam, and the best UE beam would need to be tracked by the UE for a reliable and seamless communication. FIG. 22 illustrates that Q beams are used by the BS and P beams are used by the UE. The Q BS scan beam could be sequentially swept by the BS so that beams 0~N-1 could be transmitted by BS in BF header in frame $n_f$ 2101, beams N~2N-1 could be transmitted by BS in BF header in frame $n_f$+1 2102, and so on. Thus, in order to track the UE beams, it might be intuitive to sequentially sweep and transmit the P different UE beams over the BF header. However, arbitrarily changing the UE beam instead of the best one in BF header in the UE connection may induce an significant offset on the AGC and/or timing/frequency maintenance for the UE. Thus, carefully managing the UE beam for beam tracking over the BF header would be necessary. A simple strategy is to change the UE beam, that is perform the UE beam sweep, only over a portion of the BF header but not the whole BF header. For example, the 'special' subframe in a BF header could be used to perform UE beam sweep, and keep the original best UE beam for the remaining of the BF header. Accordingly, for example, UE beam 0 could be used by UE in DL subframe of a BF header in frame nf~nf+M−1, UE beam 1 could be used in DL subframe of BF header in frame nf+M~nf+2M−1 and so forth.

Figure 23:
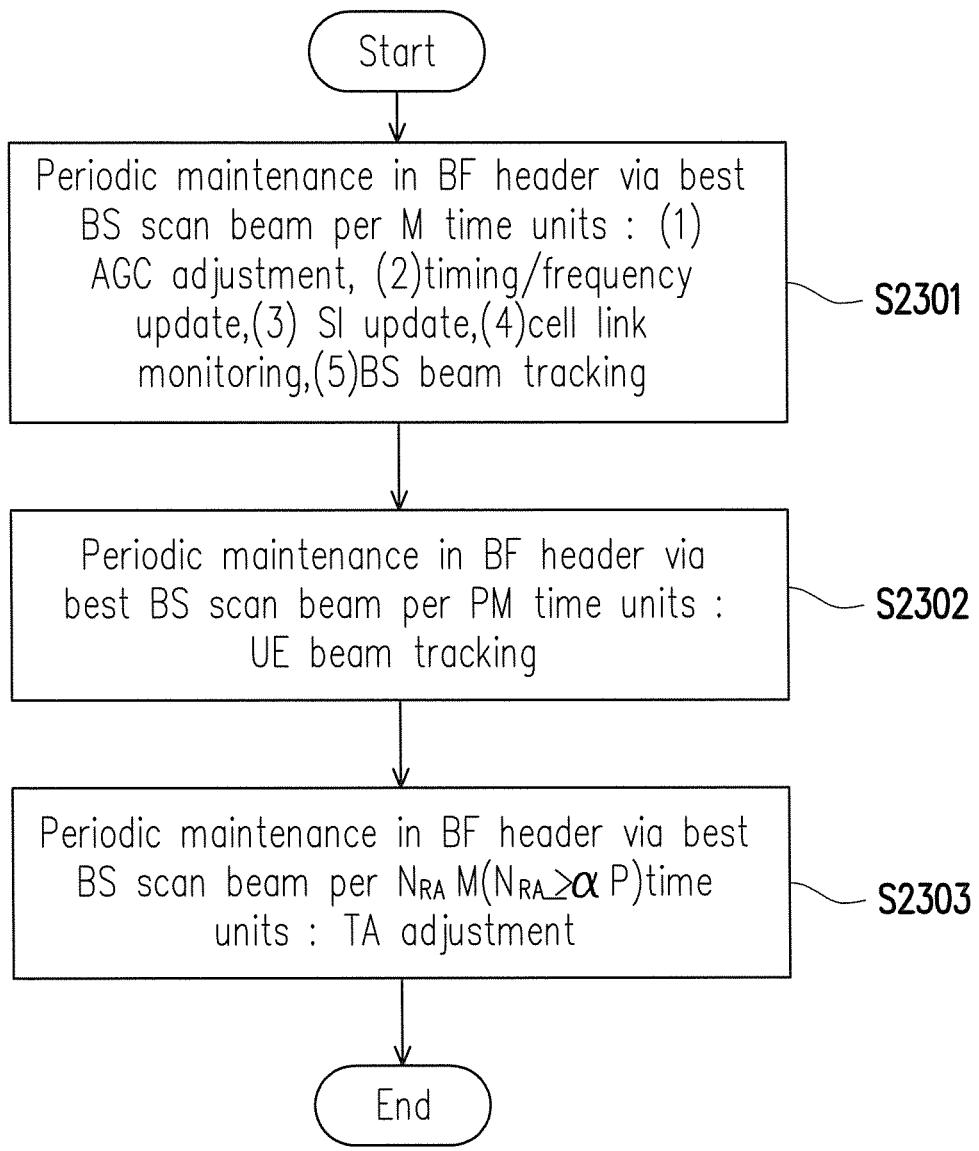
FIG. 23 illustrates a flow chart of a post network entry UE connection maintenance procedure in accordance with one of the exemplary embodiments of the disclosure.

FIG. 23 illustrates a flow chart of a post network entry UE connection maintenance procedure in accordance with one of the exemplary embodiments of the disclosure. For this exemplary embodiment, a UE could be required to report beam quality or a beam ID of the best or preferred beam of a serving BS. The report could be accomplished by transmitting the report through a physical uplink control channel (PUCCH) via the best scan beam of the serving BS. The beam quality measurement at UE for UE beam tracking and BS beam tracking could be based on SNR, SINR, RSSI, and etc. of received BTS (not BSS) within a BQMR. The procedures are described as follows.

In step S2301, the UE would perform periodic connection maintenance in BF header via the best BS scan beam per M time units to accomplish various purposes including automatic gain control (AGC) adjustments, timing/frequency update, system information (SI) update, cell link monitoring (via CRS), and BS beam tracking. In step S2302, a UE would continue to perform periodic maintenance in BF header via the best BS scan beam every (P scan beams*M) time units to accomplish UE beam tracking. In step S2303, a UE would perform periodic maintenance in BF header via the best BS scan beam per $N_{RA}M$ ($N_{RA}>\alpha P$) time units to accomplish timing advance (TA) adjustments.

Figure 24:
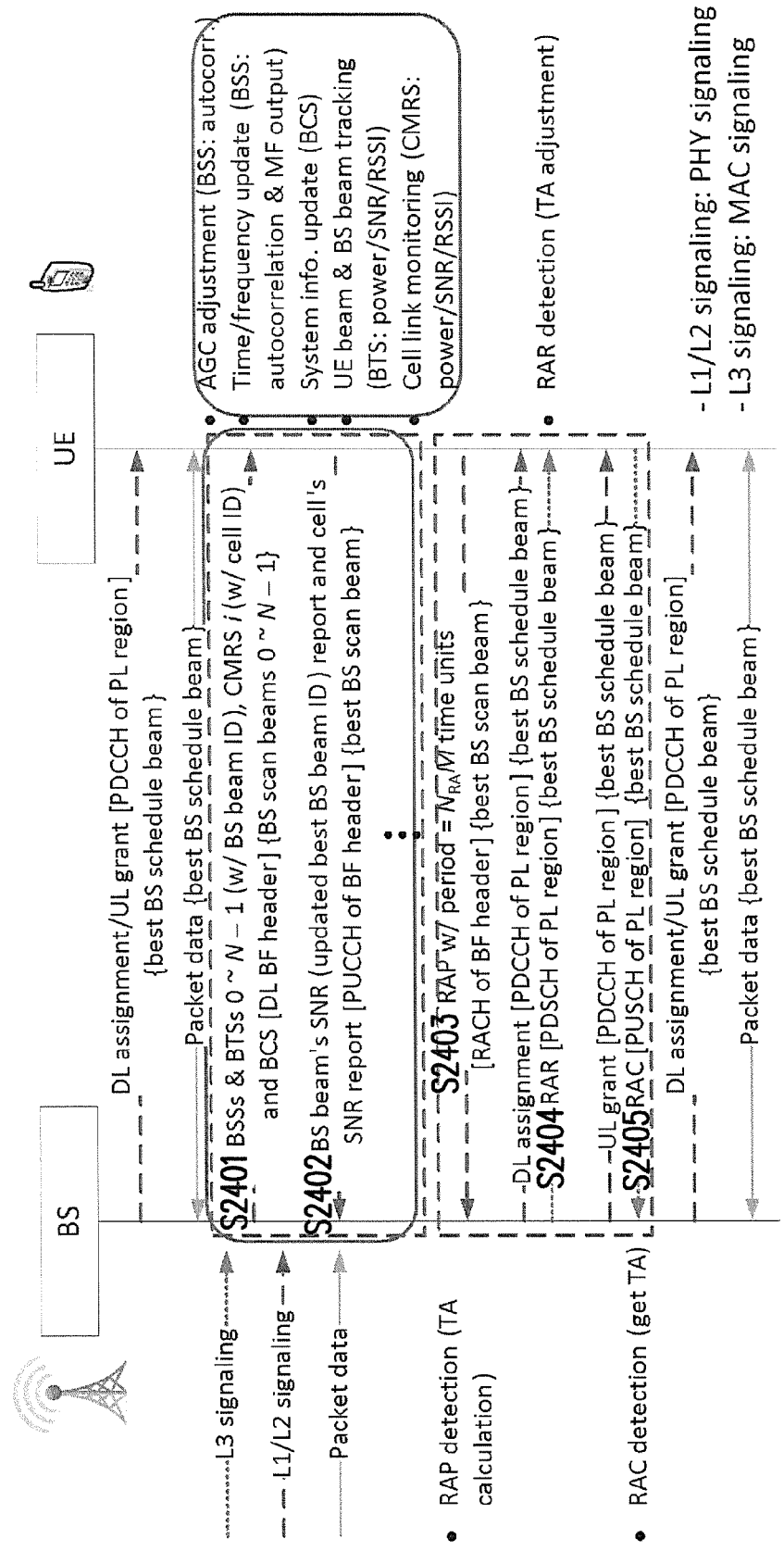
FIG. 24 illustrates a signaling diagram of a post network entry UE connection maintenance procedure in accordance with one of the exemplary embodiments of the disclosure.

FIG. 24 illustrates a signaling diagram of a post network entry UE connection procedure in accordance with one of the exemplary embodiments of the disclosure. For this exemplary embodiments, a number of main processes would need to be periodically maintained while a UE is connected to a serving BS after the UE has finished with network entry procedures. Periodic maintenances for AGC adjustment, timing/frequency update, system information update, cell link monitoring based on cell's SNR measurement (including measurement reporting) would need to be performed. BS beam tracking based on SNR measurements (including measurement reporting) of BS beams could be accomplished by monitoring BF headers of the BS scan beams per M frames. Also periodic maintenances for UE beam tracking could be accomplished by monitoring BF headers of BS scan beams per P*M frames. Period maintenances on TA adjustment could be accomplished by monitoring BF headers of BS scan beams and BS schedule beam per $N_{RA}M$ frames. The processes would be described in details as follows.

After network entry procedures have been completed, a BS may transmit a DL assignment or UL grant to a UE for packet data transmission using the best BS schedule beam. In step S2401, BSSs and BTSs corresponding to BS scan beams mN~(m+1)N−1 with BS beam IDs, CRS i with cell ID, and BCS in DL BF headers would be transmitted by a BS. In response to receiving the DL BF headers, the UE would perform autocorrelation of received BSSs to maintain the ACG and frame timing per M frames. The UE would obtain matched-filtered (MF) output of the best BSSs in DL BF header of received BSSs to maintain the frequency synchronization per M frames. The UE would maintain system information (SI) (e.g. system bandwidth, TDD DL/UL configuration, etc.) per M frames for packet data transmission based on received BCSs in DL BF headers. The UE would monitor the cell link quality per M frames for possible handover based on the SNR of received CRSs in DL BF headers. The UE would track the best one of Q BS beams per M frames and the best one of P UE beams per PM frames based on SNR of received BTSs in DL BF headers In step S2402, the UE would report the cell level SNR of received CRS of the current cell and the SNR of the BS beams (and/or the updated best BS beam ID) (of received BTS) per M frames via a physical uplink control channel (PUCCH) of a BF header on the best BS scan beam. The BS beam could thus be updated by the BS per M frames and the UE beam could thus be updated by UE per P*M frames.

In step S2403, the UE would periodically transmit non-contention based Random access preambles (RAPs) with period=$N_{RA}M$ frames via a random access channel (RACH) of BF headers on the best UE beam and the best BS scan beam to allow the BS calculate the timing advance (TA) value for UE performing TA maintenance, where $N_{RA}$ is a positive integer. A non-contention (i.e. assigned by BS) based sequence with sequence index and periodicity could be used for generating the RAP.

In step S2404, a Random access response (RAR) (embedding TA value) could be transmitted by the BS via physical downlink control channel (PDSCH) of PL region on the best UE beam and the best BS schedule beam after 1 frames from RAP reception to allow the UE to obtain the information of TA value, which could be regarded as a L3 signaling (i.e. a DL media access control (MAC) payload by a number of, for example 11, bits). A DL assignment could be allocated by BS for the current physical downlink shared channel (PDSCH) of PL region based on a specific downlink control information (DCI) format.

In step S2405, a UE may transmit a Random access confirm (RAC) (embedding TA value) via physical uplink shared channel (PUSCH) of a PL region on the best UE beam and the best BS schedule beam after M frames from RAR transmission to let BS confirm whether the TA value received by UE is correct or not. This TA value transmitted via PUSCH could be regarded as a L3 signaling (i.e. a DL MAC payload by a number of, for example 11, bits). A UL grant could be allocated by BS for current PUSCH of PL region based on another specific DCI format. Subsequently, the BS may continue to transmit DL assignments or UL grants via PDCCH of PL region on the best BS schedule beam to the UE. The UE may then communicate data packets with the BS by using the best BS schedule beam.

Figure 25:
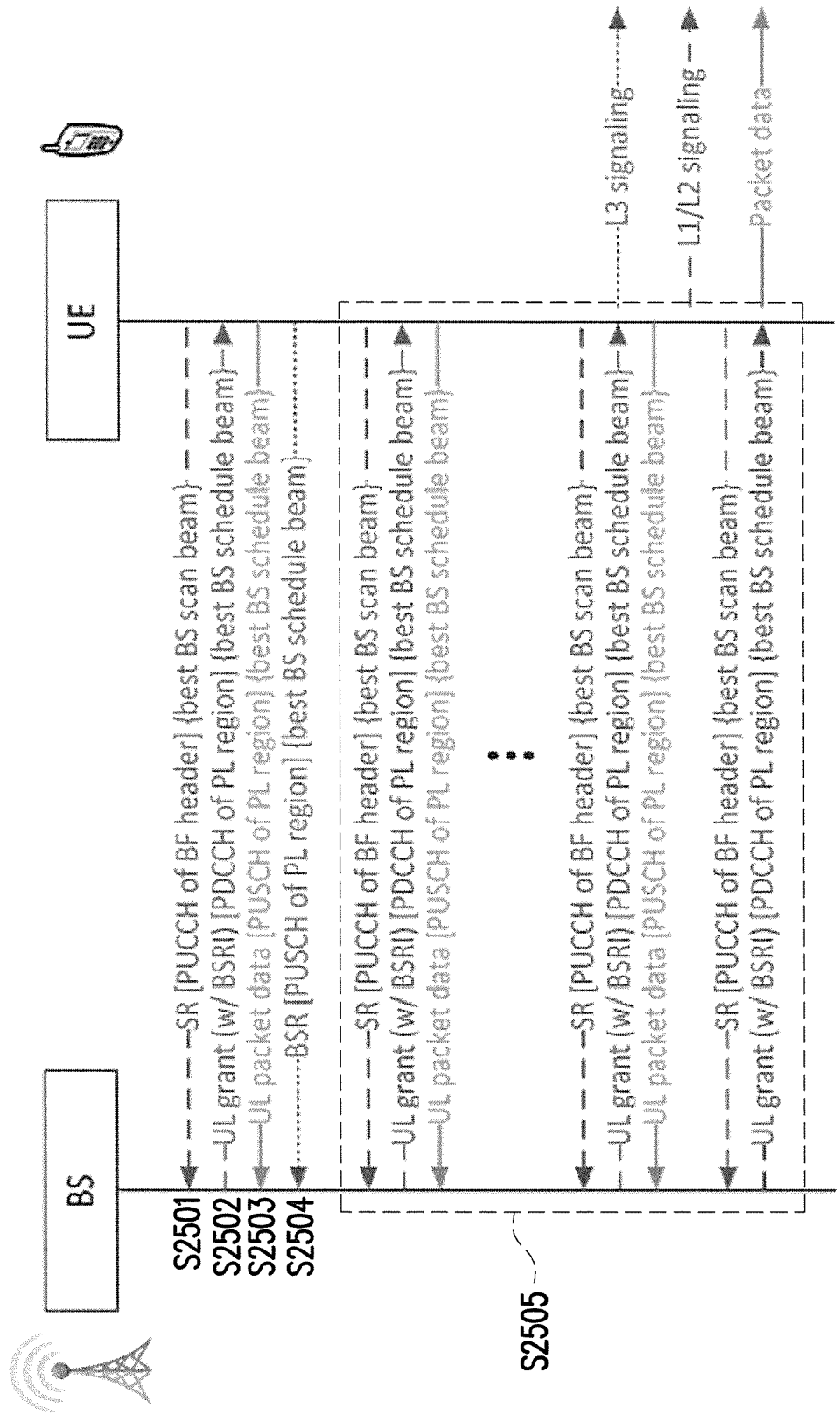
FIG. 25 illustrates an uplink schedule request procedure in accordance with one of the exemplary embodiments of the disclosure.

FIG. 25 illustrates an uplink scheduling request (SR) procedure in accordance with one of the exemplary embodiments of the disclosure. An SR refers to a UL signaling which is used by a UE to request UL resources for packet data transmission. The basic design ideas here mainly include following three processes which includes SR trigger, SR reporting, and SR grant.

First, SR triggering could be based on at least two methods. A first method involves using a UL control signal triggered by an active UE in PUCCH of BF header on the best BS scan beam. The SR triggering control signal is always transmitted before UL packet data transmission in each UL transmission. The second methods involves the SR triggering control signal being based on RAP triggered by an idle UE in RACH of BF header via the best BS scan beam. The SR triggering control signal could be periodic signaling with period of multiple time units. An example of 2-bit signaling for SR status is shown in the table below:

| SR index (SRI) | Bitmap | PUSCH Request |
| --- | --- | --- |
| 0 | [0 0] | Continuance |
| 1 | [0 1] | Presence |
| 2 | [1 0] | Absence |
| 3 | [1 1] | N/A |

SR reporting involves transmitting a buffer status report (BSR) by using L3 signaling (i.e. UL MAC PL) in PUSCH of PL region on the best BS schedule beam. The BSR could be transmitted by a UE to report how many UL resources (i.e. PUSCH size) the UE would like to request. The SR reporting is accompanies with UL packet data transmission and only reported at initial UL packet transmission. An example of 3-bit signaling for SR reporting is shown below in a table which shows a PUSCH size assigned by a BS in time domain (in frames) for SR. However, the assignment may also be in frequency domain (in resource blocks) or combination of time domain and frequency domain.

| BSR index (BSRI) | Bitmap | PUSCH size [frames] |
| --- | --- | --- |
| 0 | [0 0 0] | 0 |
| 1 | [0 0 1] | $2^0 = 1$ |
| 2 | [0 1 0] | $2^1 = 2$ |
| 3 | [0 1 1] | $2^3 = 8$ |
| 4 | [1 0 0] | $2^4 = 16$ |
| 5 | [1 0 1] | $2^6 = 64$ |
| 6 | [1 1 0] | $2^8 = 256$ |
| 7 | [1 1 1] | $2^{10} = 1024$ |

SR grant involves a two stage DL control signal granted by a BS in PDCCH of PL region on the best BS schedule beam to be transmitted to a UE. In the first stage (i.e. an initial UL grant which is a response to the SR triggering), only one UL resource unit could be assigned by the BS for the UE to perform UL transmission. However, in the second stage, (i.e. a dynamic UL grant which is a response to the SR reporting), how many of the UL resource units allocated to the UE for UL transmission could be determined by the BS based on the UE request, network capability, channel conditions, and etc.

Referring to FIG. 25 which shows a number of steps to be performed for an SR. In step S2501, a UE would trigger an SR in PUCCH of BF header on the best BS scan beam. In step S2502, a BS would transmit to the UE a UL grant (i.e. initial UL grant) having a buffer status report indicator (BSRI)=1 for only one frame in PDCCH of PL region on the best BS schedule beam for the initial UL packet transmission of the UE. In step S2503, the UE may transmit the initial UL packet transmission to the BS on the best BS schedule beam based on the initial UL grant. In step S2504, the UE would perform buffer status report (BSR) in PUSCH of PL region on the best BS schedule beam to indicate the following UL packet size to be transmitted by UE. In response to receiving the BSR, the BS may transmit to the UE the UL grant (i.e. dynamic UL grant) with BSRI=2~7 for 2~1024 frames in PDCCH of PL region on the best BS schedule beam for the following UL packet transmissions of the UE. In step S2505, in each UL packet transmission, the UE could transmit the SR status in PUCCH of BF header on the BS scan beam. For example, two statuses could be transmitted by UE in each UL packet transmission. When the 2-bit signaling with bitmap=[0 0], UE may continue the PUSCH request. When the 2-bit signaling with bitmap=[1 0], UE may interrupt the PUSCH request.

Figure 26:
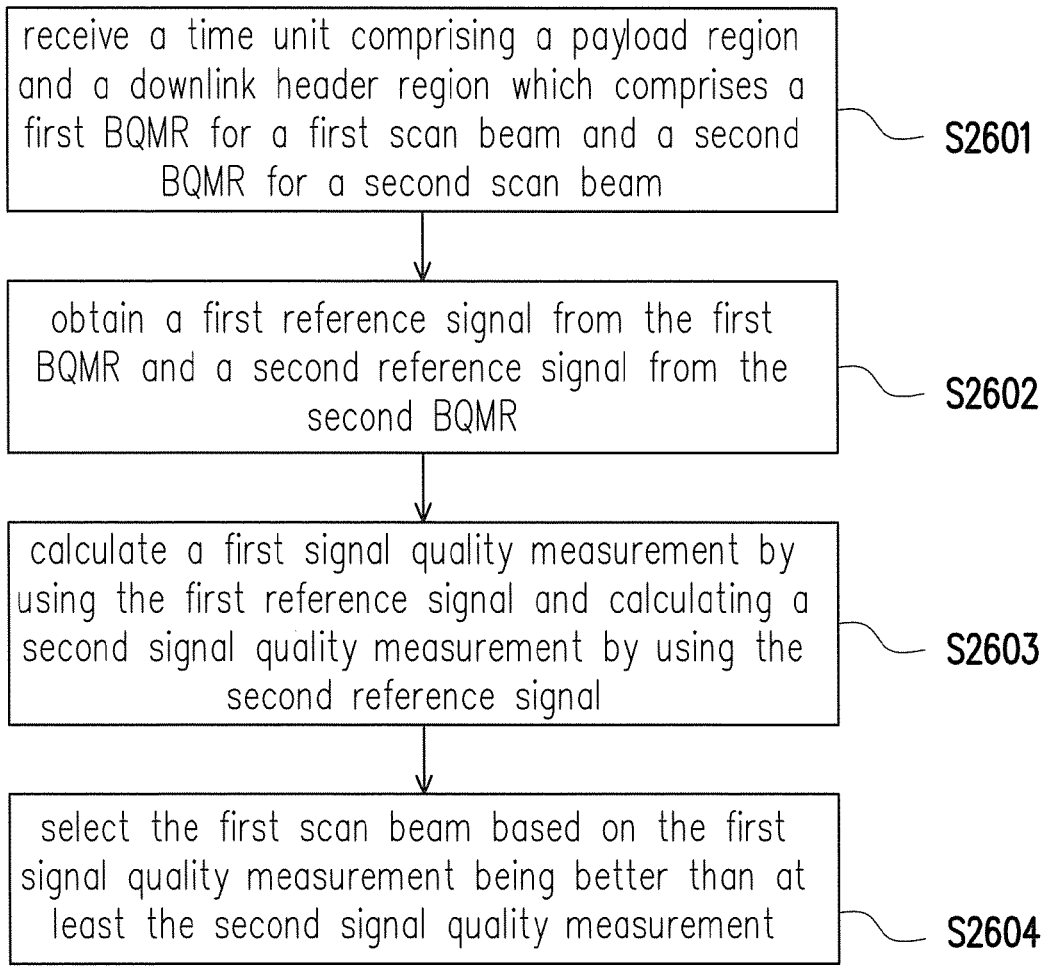
FIG. 26 illustrates the proposed post network entry connection method used by a user equipment in a millimeter wave communication system in accordance with one of the exemplary embodiments of the disclosure.

FIG. 26 illustrates the proposed post network entry connection method used by a user equipment in a millimeter wave communication system in accordance with one of the exemplary embodiments of the disclosure. In step S2601, the UE would receive a time unit comprising a payload region and a downlink header region which comprises a first BQMR for a first scan beam and a second BQMR for a second scan beam. In step S2602, the UE would obtain a first reference signal from the first BQMR and a second reference signal from the second BQMR. In step S2603, the UE would calculate a first signal quality measurement by using the first reference signal and calculating a second signal quality measurement by using the second reference signal. In step S2604, the UE would select the first scan beam based on the first signal quality measurement being better than at least the second signal quality measurement.

Figure 27:
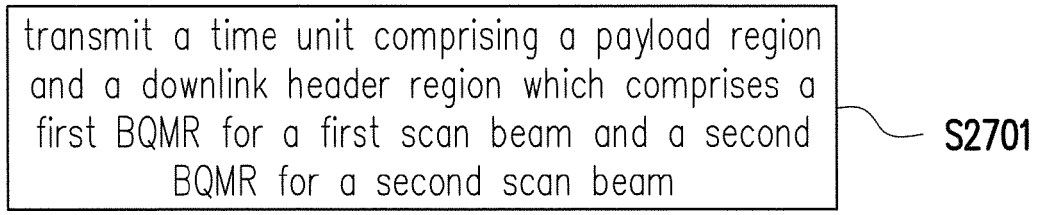
FIG. 27 illustrates the proposed post network entry connection method used by a BS in a millimeter wave communication system in accordance with one of the exemplary embodiments of the disclosure.

FIG. 27 illustrates the proposed post network entry connection method used by a BS in a millimeter wave communication system in accordance with one of the exemplary embodiments of the disclosure. In step S2701, the BS would transmit a time unit comprising a payload region and a downlink header region which comprises a first beam quality measurement resources (BQMR) for a first scan beam and a second BQMR for a second scan beam. The first BQMR would include a first reference signal and the second BQMR would include a second reference signal. The first reference signal is for calculating a first signal quality measurement and the second reference signal is for calculating a second signal quality measurement. One of at least the first scan beam or the second scan beam is selected based on comparing at least the first signal quality measurement and the second signal quality measurement.

Figure 28A:
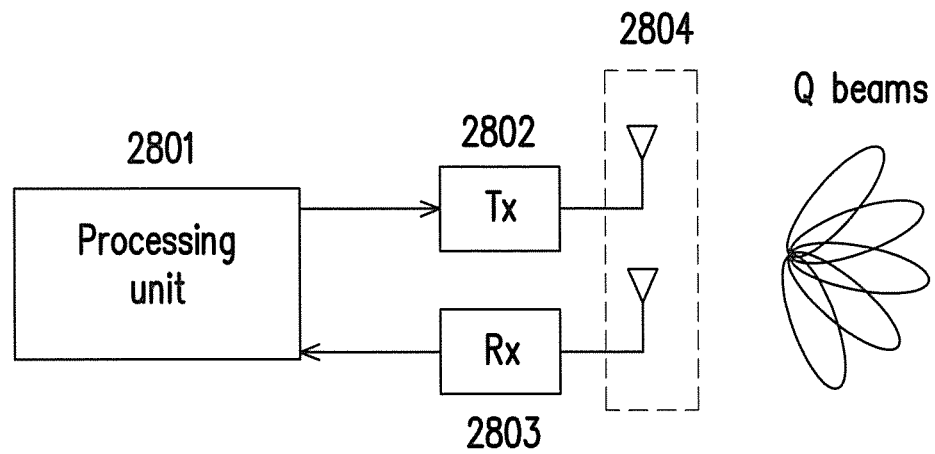
FIG. 28A illustrates the hardware of a BS in terms of functional block diagrams in accordance with one of the exemplary embodiments of the disclosure.

FIG. 28A illustrates the hardware diagram of a BS in terms of functional blocks in accordance with one of the exemplary embodiments of the disclosure. The proposed BS of the mmWave communication system may include not limited to a processing unit 2801, an mmWave transmitter 2802, an mmWave receiver 2803, and an antenna array 2804. The mmWave 2802 and mmWave receiver 2803 may also perform operations such as low noise amplifying, impedance matching, frequency mixing, up or down frequency conversion, filtering, amplifying, and so forth. The transmitter 2802 and receiver 2803 may include one or more analog-to-digital (A/D) and digital-to-analog (D/A) converters which are configured to convert from an analog signal format to a digital signal format during uplink signal processing and from a digital signal format to an analog signal format during downlink signal processing. The antenna array includes multiple antennas which would transmit and receive directional antenna beams.

The processor(s) within the processing unit 2801 is configured to process digital signals and to perform procedures of the proposed method network entry method for an mmWave communication system in accordance with the proposed exemplary embodiments of the disclosure. Also, the processing unit 2801 may access to a non-transitory storage medium which stores programming codes, codebook configurations, buffered data, or record configurations assigned by the processing unit 2801. The processor(s) within the processing unit 2801 could be implemented by using programmable units such as a micro-processor, a micro-controller, a DSP chips, FPGA, etc. The functions of the processor(s) may also be implemented with separate electronic devices or ICs. It should be noted that the functions of processor(s) may be implemented with either hardware or software.

The term "user equipment" (UE) in this disclosure may be, for example, a mobile station, an advanced mobile station (AMS), a server, a client, a desktop computer, a laptop computer, a network computer, a workstation, a personal digital assistant (PDA), a tablet personal computer (PC), a scanner, a telephone device, a pager, a camera, a television, a hand-held video game device, a musical device, a wireless sensor, and the like. In some applications, a UE may be a fixed computer device operating in a mobile environment, such as a bus, a train, an airplane, a boat, a car, and so forth.

Figure 28B:
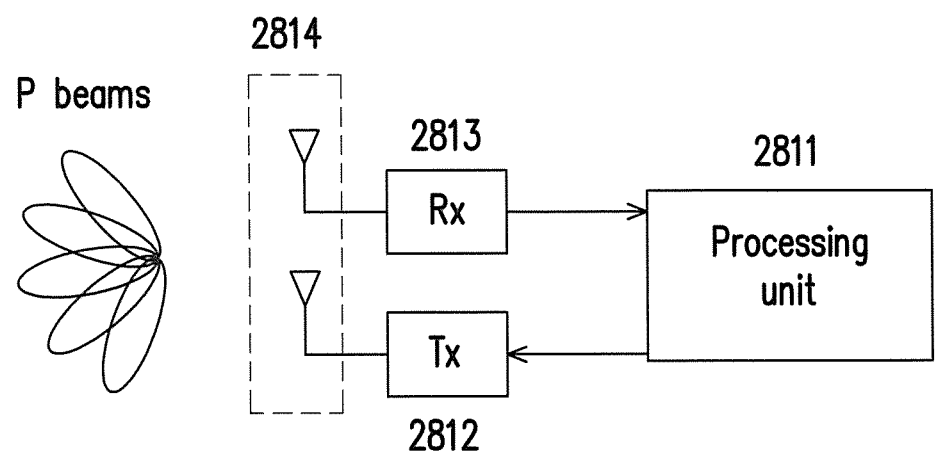
FIG. 28B illustrates the hardware of a user equipment in terms of functional block diagrams in accordance with one of the exemplary embodiments of the disclosure.

FIG. 28B illustrates the hardware diagram of a UE in terms of functional blocks in accordance with one of the exemplary embodiments of the disclosure. The proposed UE of the mmWave communication system would include not limited to a processing unit 2811, an mmWave transmitter 2812, an mmWave receiver 2813, and an antenna array 2804. The mmWave transmitter 2812 and mmWave receiver 2813 may also perform operations such as low noise amplifying, impedance matching, frequency mixing, up or down frequency conversion, filtering, amplifying, and so forth. The transmitter 2812 and receiver 2813 may include one or more analog-to-digital (A/D) and digital-to-analog (D/A) converters which are configured to convert from a digital signal format to an analog signal format during uplink signal processing and from an analog signal format to digital signal format during downlink signal processing. The antenna array includes multiple antennas which would transmit and receive directional antenna beams.

The processor(s) within the processing unit 2811 is configured to process digital signals and to perform procedures of the proposed method network entry method for an mmWave communication system in accordance with the proposed exemplary embodiments of the disclosure. Also, the processing unit 2811 may access to a non-transitory storage medium which stores programming codes, codebook configurations, buffered data, or record configurations assigned by the processing unit 2811. The processor(s) within the processing unit 2811 could be implemented by using programmable units such as a micro-processor, a micro-controller, a DSP chips, FPGA, etc. The functions of the processor(s) may also be implemented with separate electronic devices or ICs. It should be noted that the functions of processor(s) may be implemented with either hardware or software In view of the aforementioned descriptions, the present disclosure is suitable for being used in a wireless communication system and is able to enable a BS and a user equipment to perform beamforming of both control signal and user data signal and to maintain a stable connection in an mmWave communication system.

No element, act, or instruction used in the detailed description of disclosed embodiments of the present application should be construed as absolutely critical or essential to the present disclosure unless explicitly described as such. Also, as used herein, each of the indefinite articles "a" and "an" could include more than one item. If only one item is intended, the terms "a single" or similar languages would be used. Furthermore, the terms "any of" followed by a listing of a plurality of items and/or a plurality of categories of items, as used herein, are intended to include "any of", "any combination of", "any multiple of", and/or "any combination of multiples of the items and/or the categories of items, individually or in conjunction with other items and/or other categories of items. Further, as used herein, the term "set" is intended to include any number of items, including zero. Further, as used herein, the term "number" is intended to include any number, including zero.

It will be apparent to those skilled in the art that various modifications and variations can be made to the structure of the disclosed embodiments without departing from the scope or spirit of the disclosure. In view of the foregoing, it is intended that the disclosure cover modifications and variations of this disclosure provided they fall within the scope of the following claims and their equivalents.

What is claimed is:

1. A post network entry connection method used by a user equipment (UE) in a millimeter wave communication system, the method comprising:
   completing a random access procedure between the UE and a base station to establish a wireless connection between the UE and the base station; and
   maintaining the wireless connection at least by:
      receiving a plurality of radio frames, wherein each of the radio frames comprises a payload region and a beamforming header region, and each of the beamforming header region comprises a first beam quality measurement resource (BQMR) for a first scan beam and a second BQMR for a second scan beam;
      obtaining a first reference signal from the first BQMR and a second reference signal from the second BQMR;
      calculating a first signal quality measurement by using the first reference signal and calculating a second signal quality measurement by using the second reference signal;
      selecting the first scan beam based on the first signal quality measurement being better than at least the second signal quality measurement;
      transmitting the first signal quality measurement which corresponds to the first scan beam via another radio frame; and
      transmitting packet data by using the first scan beam.

2. The method of claim 1, wherein calculating the first signal quality measurement by using the first reference signal comprising:
   calculating the first signal quality measurement by using the first reference signal which is a beam tracking signal embedded within the first BQMR.

3. The method of claim 1, wherein the first BQMR and the second BQMR are not adjacent to each other and are distributed throughout the beamforming header region.

4. The method of claim 1, wherein the first BQMR and the second BQMR are allocated right next to each other.

5. The method of claim 1 further comprising:
   sweeping one UE beam while receiving a plurality of scan beams after completing a network entry procedure.

6. The method of claim 5, wherein the beamforming header region further comprises a non-BQMR resource in which a best UE beam of a plurality of UE beams is allocated and a plurality of BQMR resources in which UE beams are allocated as each BQMR resource of the plurality of BQMR resources is allocated for a different UE beam.

7. The method of claim 1, wherein the first signal quality measurement corresponding to the first scan beam which has been determined as a best scan beam is transmitted via a physical uplink control channel (PUCCH) of the another radio frame.

8. The method of claim 1 further comprising:
   continuously receiving a plurality of BTSs and cell specific reference signal (CRSs);
   transmitting a beam quality report of each of BS scan beams based on the received plurality of BTSs and transmitting a cell level signal quality report based on the received CRSs; and
   determining whether to select another UE beam.

9. The method of claim 7 further comprising:
   performing a scheduling request procedure by:
      transmitting a scheduling request on a best BS scan beam;
      receiving an uplink grant having a buffer status report indicator for only one radio frame on a best BS schedule beam;
      transmitting an uplink packet data over the only one radio frame on the best BS schedule beam;
      transmitting a buffer status report to indicate a following uplink packet size to be transmitted; and
      receiving an uplink grant for following uplink packet transmissions in response to transmitting the buffer status report.

10. The method of claim 9, wherein the scheduling request procedure further comprising:
    transmitting a scheduling request status in the physical uplink control channel (PUCCH) by using the best BS scan beam for each uplink packet transmission.

11. The method of claim 1, wherein the beamforming header region further comprises a beam search signal (BSS) which is used by an autocorrelation calculation to maintain automatic gain control (AGC) and is used by an autocorrelation calculation and a matched filter calculation to maintain time and frequency update after completing a network entry procedure.

12. The method of claim 1, wherein the beamforming header region further comprises a broadcast signal (BCS) which is used to maintain a system information after completing a network entry procedure.

13. The method of claim 1, wherein the beamforming header region further comprises a cell specific reference signal (CRS) which is used to monitor cell quality for executing a handover after completing a network entry procedure.

14. The method of claim 1, wherein the beamforming header region further comprises a beam tracking signal (BTS) which is used to track a best BS scan beam and a best UE beam after completing a network entry procedure.

15. A post network entry connection method used by a base station (BS) in a millimeter wave (mmWave) communication system, the method comprising:
    completing a random access procedure between a user equipment (UE) and the base station to establish a wireless connection between the UE and the base station; and maintaining the wireless connection at least by:
  transmitting a plurality of radio frames, wherein each of the radio frames comprises a payload region and a beamforming header region, and each of the beamforming header region comprises a first beam quality measurement resource (BQMR) for a first scan beam and a second BQMR for a second scan beam, wherein
    the first BQMR comprises a first reference signal and the second BQMR comprises a second reference signal; the first reference signal is for calculating a first signal quality measurement and the second reference signal is for calculating a second signal quality measurement; and the first scan beam is selected based on the first signal quality measurement being better than at least the second signal quality measurement;
  receiving the first signal quality measurement which corresponds to the first scan beam via another radio frame; and
  receiving packet data by using the first scan beam.

16. The method of claim 15, wherein the first signal quality measurement is to be received by transmitting the first reference signal which is a beam tracking signal (BTS) embedded within the first BQMR.

17. The method of claim 15, wherein the first BQMR and the second BQMR are not adjacent to each other and are distributed throughout the beamforming header region.

18. The method of claim 15, wherein the first BQMR and the second BQMR are allocated right next to each other.

19. The method of claim 15 further comprising:
  receiving sweeping of one UE beam while transmitting a plurality of scan beams after completing a network entry procedure.

20. The method of claim 19, wherein the beamforming header region further comprises a non-BQMR resource in which a best UE beam of a plurality of UE beams is allocated and a plurality of BQMR resources in which UE beams are allocated as each BQMR resource of the plurality of BQMR resources is allocated for a different UE beam.

21. The method of claim 15, wherein the first signal quality measurement corresponding to the first scan beam which has been determined as a best scan beam is received via a physical uplink control channel (PUCCH) of the another radio frame.

22. The method of claim 15 further comprising:
  continuously transmitting a plurality of BTSs, cell specific reference signal (CRS) and a broadcast signal (BCS);
  receiving a beam quality report of each of BS scan beams and receiving a cell level signal quality report; and
  determining whether another BS beam are selected after receiving the beam quality report.

23. The method of claim 22 further comprising:
  performing a scheduling request procedure by:
    receiving a scheduling request on a best BS scan beam;
    transmitting an uplink grant having a buffer status report indicator for only one radio frame on a best BS schedule beam;
    receiving an uplink packet data over the only one radio frame on the best BS schedule beam;
    receiving a buffer status report to indicate a following uplink packet size to be transmitted by UE; and
    transmitting an uplink grant for following uplink packet transmissions in response to transmitting the buffer status report.

24. The method of claim 23, wherein the scheduling request procedure further comprising:
  receiving a scheduling request status in a physical uplink control channel (PUCCH) by using the best BS scan beam for each uplink packet transmission.

25. The method of claim 15, wherein the beamforming header region further comprises a beam search signal (BSS) which is used by an autocorrelation calculation to maintain automatic gain control (AGC) and is used by an autocorrelation calculation and a matched filter calculation to maintain time and frequency update after completing a network entry procedure.

26. The method of claim 15, wherein the beamforming header region further comprises a broadcast signal (BCS) which is used to maintain a system information after completing a network entry procedure.

27. The method of claim 15, wherein the beamforming header region further comprises a cell specific reference signal (CRS) which is used to monitor cell quality for executing a handover after completing a network entry procedure.

28. The method of claim 15, wherein the beamforming header region further comprises a beam tracking signal (BTS) which is used to track a best BS scan beam and a best UE beam after completing a network entry procedure.

29. A user equipment (UE) comprising:
  a receiver configured to receive signals in a millimeter waves range;
  a transmitter configured to transmit signals in the millimeter waves range; and
  a processor coupled to the receiver and the transmitter and is configured at least to:
    complete a random access procedure between the UE and a base station to establish a wireless connection between the UE and the base station; and
    maintaining the wireless connection at least by:
      receiving, via the receiver, a plurality of radio frames, wherein each of the radio frames comprises a payload region and a beamforming header region, and each of the beamforming header region comprises a first beam quality measurement resource (BQMR) for a first scan beam and a second BQMR for a second scan beam;
      obtaining a first reference signal from the first BQMR and a second reference signal from the second BQMR;
      calculating a first signal quality measurement by using the first reference signal and calculating a second signal quality measurement by using the second reference signal;
      selecting the first scan beam based on the first signal quality measurement being better than at least the second signal quality measurement;
      transmitting, via the transmitter, the first signal quality measurement which corresponds to the first scan beam via another radio frame; and
      transmitting, via the transmitter, packet data by using the first scan beam.

30. A base station comprising:
  a receiver configured to receive signals in a millimeter waves range;
  a transmitter configured to transmit signals in the millimeter waves range; and a processor coupled to the receiver and the transmitter and is configured at least to:
  complete a random access procedure between a user equipment (UE) and the base station to establish a wireless connection between the UE and the base station; and
  maintaining the wireless connection at least by:
    transmitting, via the transmitter, a plurality of radio frames, wherein each of the radio frames comprises a payload region and a beamforming header region, and each of the beamforming header region comprises a first beam quality measurement resource (BQMR) for a first scan beam and a second BQMR for a second scan beam, wherein the first BQMR comprises a first reference signal and the second BQMR comprises a second reference signal; the first reference signal is for calculating a first signal quality measurement and the second reference signal is for calculating a second signal quality measurement; and
    one of at least the first scan beam or the second scan beam is selected based on comparing at least the first signal quality measurement and the second signal quality measurement;
    receiving, via the receiver, the first signal quality measurement which corresponds to the first scan beam via another radio frame; and
    receiving, via the receiver, packet data by using the first scan beam.

31. The method of claim 4, wherein the UE transmits packet data by using the second scan beam before selecting the first scan beam based on the first signal quality measurement being better than at least the second signal quality measurement.

32. The method of claim 18, wherein the BS receives packet data by using the second scan beam before the first scan beam is selected based on the first signal quality measurement being better than at least the second signal quality measurement.

* * * * *